US010203986B2

(12) United States Patent
Rakitzis et al.

(10) Patent No.: US 10,203,986 B2
(45) Date of Patent: *Feb. 12, 2019

(54) DISTRIBUTED STORAGE DATA REPAIR AIR VIA PARTIAL DATA REBUILD WITHIN AN EXECUTION PATH

(71) Applicant: Igneous Systems, Inc., Seattle, WA (US)

(72) Inventors: Triantaphyllos Byron Rakitzis, Seattle, WA (US); Eric Michael Lemar, Seattle, WA (US); Jeffrey Douglas Hughes, Seattle, WA (US); Kiran V. Bhageshpur, Seattle, WA (US); Anu Engineer, Sammamish, WA (US)

(73) Assignee: Igneous Systems, Inc., Seattle, WA (US)

( * ) Notice: Subject to any disclaimer, the term of this patent is extended or adjusted under 35 U.S.C. 154(b) by 72 days.

This patent is subject to a terminal disclaimer.

(21) Appl. No.: 14/954,616

(22) Filed: Nov. 30, 2015

(65) Prior Publication Data

US 2016/0085588 A1 Mar. 24, 2016

Related U.S. Application Data

(63) Continuation of application No. 14/315,139, filed on Jun. 25, 2014, now Pat. No. 9,201,735.

(51) Int. Cl.
*G06F 9/50* (2006.01)
*G06F 9/48* (2006.01)
(Continued)

(52) U.S. Cl.
CPC .............. *G06F 9/5016* (2013.01); *G06F 9/48* (2013.01); *G06F 9/5038* (2013.01);
(Continued)

(58) Field of Classification Search
CPC ........ G06F 9/5016; G06F 9/48; G06F 9/5038; G06F 9/5083; G06F 11/10;
(Continued)

(56) References Cited

U.S. PATENT DOCUMENTS 6,567,826 B1 5/2003 Fischer et al.
6,615,314 B1 9/2003 Higaki et al.
(Continued)

FOREIGN PATENT DOCUMENTS

WO 2014004234 A1 1/2014

OTHER PUBLICATIONS

Office Communication for U.S. Appl. No. 14/454,651 dated Nov. 5, 2014 (7 pages).
(Continued)

*Primary Examiner* — Benjamin C Wu
(74) *Attorney, Agent, or Firm* — John W. Branch; Lowe Graham Jones PLLC

(57) ABSTRACT

Embodiments are directed towards managing the distribution of tasks in a storage system. An execution path for tasks may be generated based on the type of the task and characteristics of the storage system such that the execution path includes storage computers in a storage system. The tasks may be provided to each storage computer in the execution path. A working set of intermediate results may be generated on the storage computer in the execution path. If there is more than one storage computer in the execution path, working sets may be iteratively communicated to a next storage computer in the execution path such that the next storage computer employs a previously generated working set to generate a next working set until each storage computer in the execution path has been employed to generate a working set. The results may be stored on the storage computers.

16 Claims, 15 Drawing Sheets

(51) Int. Cl.
*G06F 11/14* (2006.01)
*G06F 11/10* (2006.01)
*H04L 29/08* (2006.01)

(52) U.S. Cl.
CPC ............ *G06F 9/5083* (2013.01); *G06F 11/10* (2013.01); *G06F 11/1088* (2013.01); *G06F 11/1092* (2013.01); *G06F 11/14* (2013.01); *G06F 11/1402* (2013.01); *H04L 67/1097* (2013.01)

(58) Field of Classification Search
CPC .. G06F 11/1088; G06F 11/1092; G06F 11/14; G06F 11/1402; H04L 67/1097
See application file for complete search history.

(56) References Cited

U.S. PATENT DOCUMENTS

| | | | |
|---|---|---|---|
| 6,647,514 B1 | 11/2003 | Umberger et al. | |
| 7,020,587 B1 | 3/2006 | Di et al. | |
| 7,305,579 B2 | 12/2007 | Williams | |
| 7,451,344 B1 | 11/2008 | Rothberg | |
| 8,006,128 B2 | 8/2011 | Olster | |
| 8,140,914 B2 | 3/2012 | Murphy et al. | |
| 8,200,842 B1 | 6/2012 | Lau | |
| 8,438,420 B1 | 5/2013 | Dutch et al. | |
| 8,452,819 B1 | 5/2013 | Sorenson, III et al. | |
| 8,751,739 B1 | 6/2014 | Bjornsson | |
| 8,751,861 B2 | 6/2014 | Nair et al. | |
| 8,850,108 B1 | 9/2014 | Hayes et al. | |
| 9,003,144 B1 | 4/2015 | Hayes et al. | |
| 9,075,773 B1 | 7/2015 | Rakitzis et al. | |
| 9,087,012 B1 | 7/2015 | Hayes et al. | |
| 9,276,900 B1 | 3/2016 | Daud et al. | |
| 2003/0007482 A1 | 1/2003 | Khello et al. | |
| 2006/0015771 A1 | 1/2006 | Gundy et al. | |
| 2006/0190683 A1 | 8/2006 | Takase | |
| 2007/0083723 A1 | 4/2007 | Dey et al. | |
| 2007/0220313 A1 | 9/2007 | Katsuragi et al. | |
| 2007/0276905 A1 | 11/2007 | Durand et al. | |
| 2008/0069100 A1 | 3/2008 | Weyman et al. | |
| 2008/0126844 A1 | 5/2008 | Morita et al. | |
| 2008/0199155 A1 | 8/2008 | Hagens et al. | |
| 2009/0106578 A1 | 4/2009 | Dilman et al. | |
| 2009/0172285 A1 | 7/2009 | Smith et al. | |
| 2010/0306409 A1 | 12/2010 | Jansen et al. | |
| 2010/0312875 A1 | 12/2010 | Wilerson et al. | |
| 2011/0029809 A1 | 2/2011 | Dhuse et al. | |
| 2011/0138124 A1 | 6/2011 | Hill et al. | |
| 2011/0282936 A1 | 11/2011 | Chekhanovskiy et al. | |
| 2011/0289378 A1 | 11/2011 | Grube et al. | |
| 2012/0079317 A1 | 3/2012 | Nelogal et al. | |
| 2012/0215874 A1 | 8/2012 | Sequeira et al. | |
| 2012/0226871 A1 | 9/2012 | Cantin et al. | |
| 2012/0303736 A1 | 11/2012 | Novotny et al. | |
| 2012/0317254 A1 | 12/2012 | Chekhanovskiy et al. | |
| 2013/0018978 A1 | 1/2013 | Crowe et al. | |
| 2013/0024723 A1 | 1/2013 | Govindasamy | |
| 2013/0054913 A1 | 2/2013 | Maeda et al. | |
| 2013/0073896 A1 | 3/2013 | Le Scouarnec | |
| 2013/0166816 A1 | 6/2013 | Atkisson et al. | |
| 2013/0275815 A1 | 10/2013 | De Keyser et al. | |
| 2013/0286579 A1 | 10/2013 | De Spiegeleer et al. | |
| 2013/0290775 A1 | 10/2013 | Tucek et al. | |
| 2014/0101283 A1 | 4/2014 | Alnafoosi et al. | |
| 2014/0337530 A1 | 11/2014 | Amishav et al. | |
| 2014/0365819 A1 | 12/2014 | Cooper et al. | |

OTHER PUBLICATIONS

Office Communication for U.S. Appl. No. 14/272,303 dated Dec. 22, 2014 (17 pages).
Office Communication for U.S. Appl. No. 14/550,466 dated Feb. 9, 2015 (9 pages).
Office Communication for U.S. Appl. No. 14/454,651 dated Apr. 24, 2015 (9 pages).
Office Communication for U.S. Appl. No. 14/272,303 dated May 7, 2015 (7 pages).
Office Communication for U.S. Appl. No. 14/663,359 dated May 18, 2015 (11 pages).
Office Communication for U.S. Appl. No. 14/550,466 dated Jun. 3, 2015 (5 pages).
International Search Report and Written Opinion for International Patent Application No. PCT/US2015/029215 dated Jul. 7, 2015 (9 pages).
International Search Report and Written Opinion for International Application No. PCT/US2015/031397 dated Aug. 4, 2015 (9 pages).
Office Communication for U.S. Appl. No. 14/792,539 dated Sep. 15, 2015 (8 pages).
Office Communication for U.S. Appl. No. 14/663,359 dated Oct. 7, 2015 (14 pages).
Office Communication for U.S. Appl. No. 14/315,139 dated Sep. 4, 2014 (16 pages).
Office Communication for U.S. Appl. No. 14/315,139 dated Dec. 26, 2014 (15 pages).
Office Communication for U.S. Appl. No. 14/315,139 dated May 7, 2015 (15 pages).
Office Communication for U.S. Appl. No. 14/315,139 dated Aug. 27, 2015 (11 pages).
Office Communication for U.S. Appl. No. 14/792,539 dated Feb. 8, 2016 (8 pages).
Office Communication for U.S. Appl. No. 15/056,773 dated May 19, 2016 (9 pages).
International Search Report and Written Opinion for Application PCT/US2016/017529 dated Jun. 13, 2016, 12 pages.
Office Communication for U.S. Appl. No. 14/663,359 dated Jan. 15, 2016 (9 pages).
Official Communication for U.S. Appl. No. 15/056,773 dated Oct. 11, 2016, 9 pages.

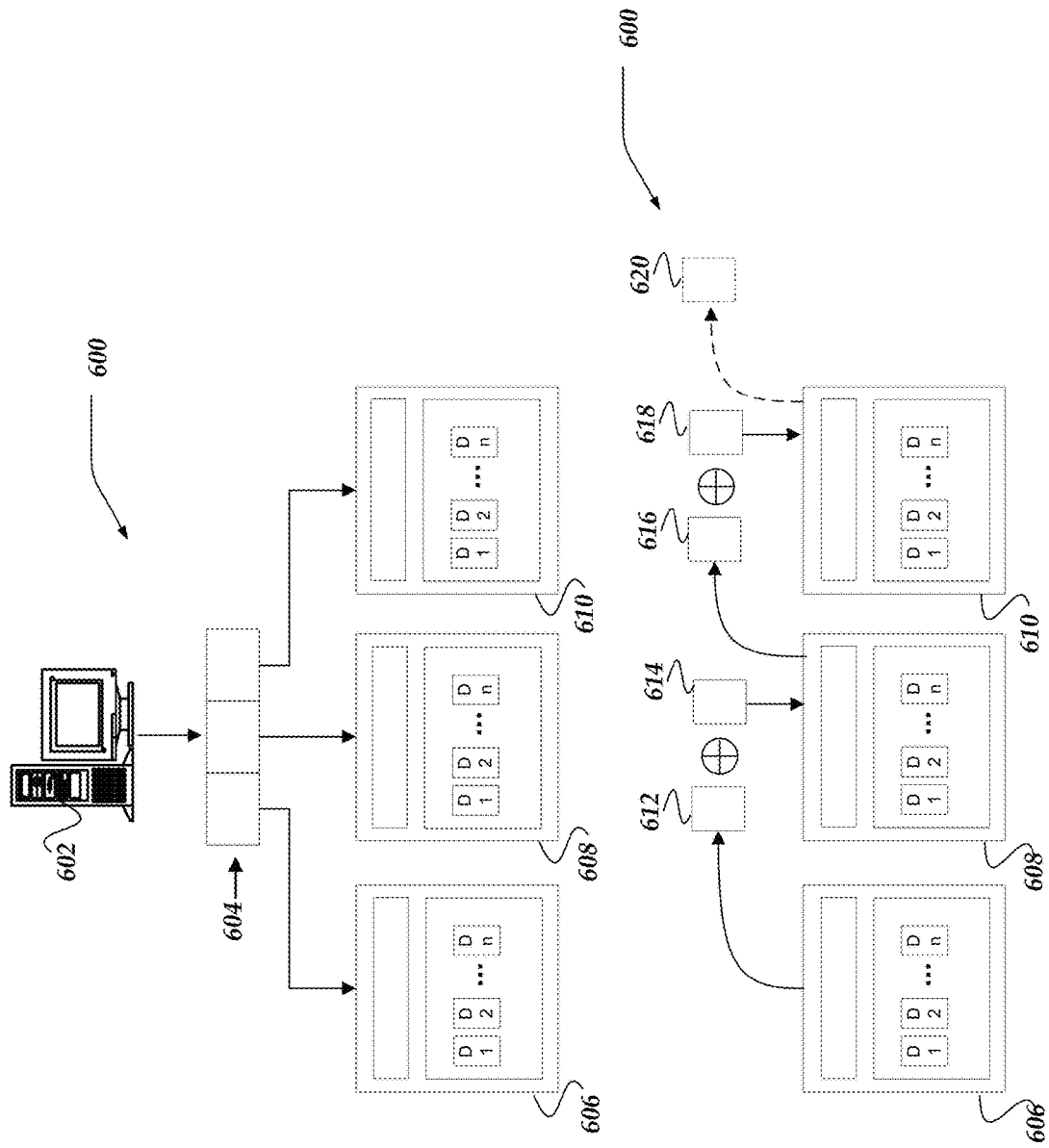

DISTRIBUTED STORAGE DATA REPAIR AIR VIA PARTIAL DATA REBUILD WITHIN AN EXECUTION PATH

CROSS-REFERENCE TO RELATED APPLICATIONS

This Utility Patent Application is a Continuation of U.S. patent application Ser. No. 14/315,139 filed on Jun. 25, 2014, now U.S. Pat. No. 9,201,735 issued on Dec. 1, 2015, entitled "DISTRIBUTED STORAGE DATA REPAIR AIR VIA PARTIAL DATA REBUILD WITHIN AN EXECUTION PATH," the benefit of which is claimed under 35 U.S.C. § 120, and which is further incorporated by reference in its entirety.

TECHNICAL FIELD

This invention relates generally to managing data storage in a network, and more particularly, but not exclusively, to managing and the distribution of tasks in a data storage system.

BACKGROUND

The growth of the amount of data generated and retained by modern enterprises continues to increase. This explosion in data has led to larger and larger data storage systems. In some cases, these data storage systems may include thousands of storage devices. Unfortunately, as number of storage devices in a storage system increases the probability of storage device failure within a storage system increases as well. A storage system may employ one or more data recovery techniques to restore data lost or corrupted due to storage device failure. However, as size of the data storage and the number of storage devices continues to increase, data restoration may increasingly take a disadvantageously long time to complete. Also, as the increase in the size of the stored data sets continues to outstrip the growth of networking and computing capacity it may be difficult to execute computing tasks, such as repair tasks, on the large data sets. Thus, it is with respect to these considerations and others that the invention has been made.

BRIEF DESCRIPTION OF THE DRAWINGS

FIGS. 6A and 6B illustrate a logical schematic of a storage system that may be arranged to employ distributed tasks in accordance with at least one the various embodiments;

DETAILED DESCRIPTION OF THE EMBODIMENTS

Figure 1:
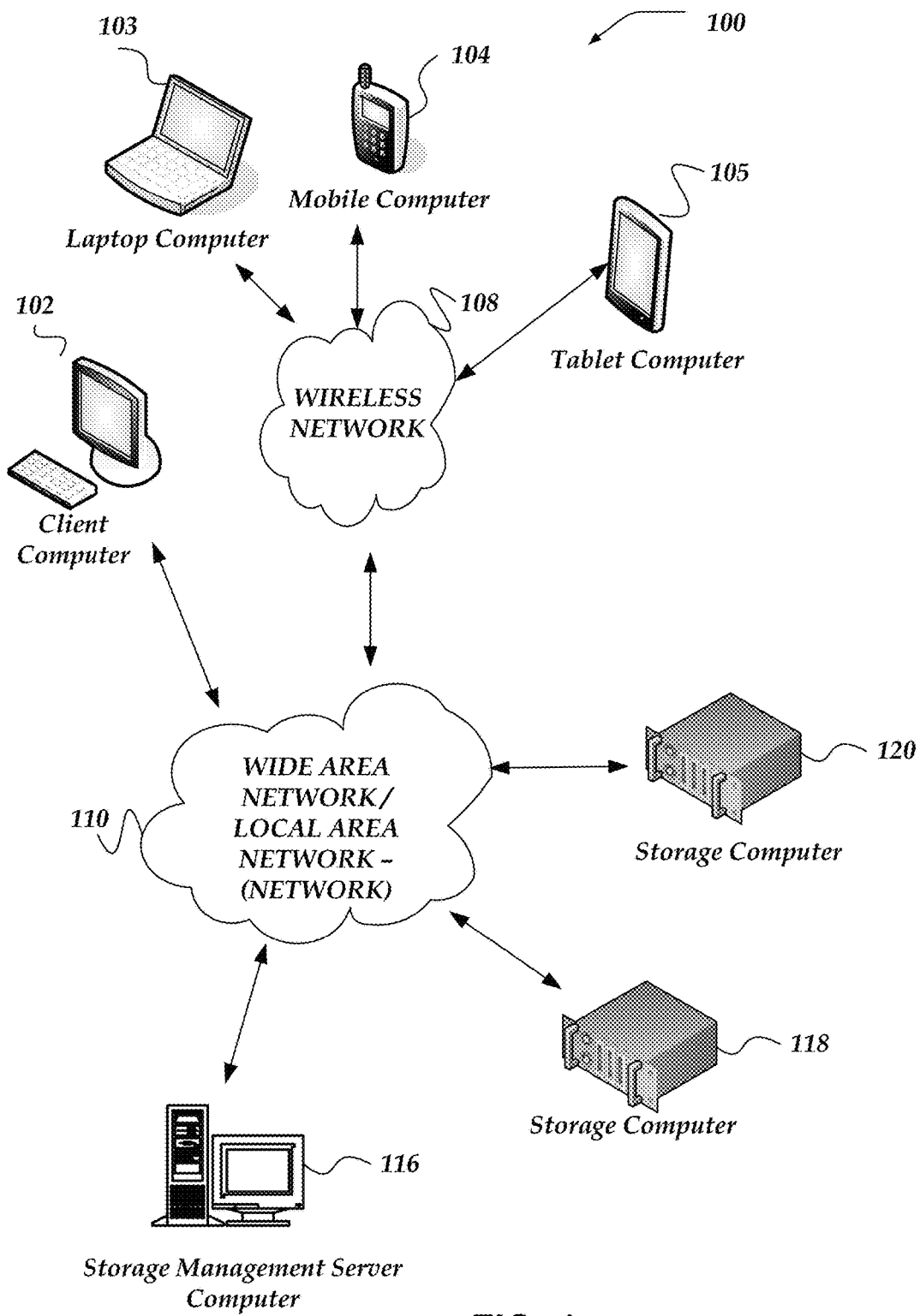
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

The term "storage device" as used herein refers to various apparatus for storing digital information, generally for use by computers. Storage devices may be fixed or removable nonvolatile memory systems, such as, magnetic hard drives, magnetic tape, optical drives, solid state drives (SSD), flash memory storage, or the like. Typically, one or more storage devices may be arranged to store information for use in a computer system.

The term "storage computer" as used herein refers to a computer that is arranged to include one or more storage devices. In at least one of the various embodiments, a storage computer may include several storage devices inside a chassis. In other embodiments, the storage devices may be integrated with the storage computer.

The term "storage unit," or "storage block" as used herein refers to portions of the storage system that are dedicated to storing source data or source symbols. Storing data in a storage unit does not imply a particular data format (e.g., compressed v. non-compressed, encrypted v. unencrypted). Data located in a storage unit may be used as source symbols for erasure coding based data protection.

The term "repair symbol unit," or "repair symbol block" as used herein refers to portions of the storage system that are dedicated to storing encoding symbols generated for erasure coding data protection. Accordingly, the data stored on repair symbol units is generated from source symbols that are stored on storage units or storage blocks.

The term "CPU complex" as used herein refers to portion of a computer that generally includes, one or more CPU's, cache memory, RAM, I/O components, or the like. Herein, having one or more CPU complexes at least distinguishes a storage computer from a storage device.

The term "protection level" as used herein refers to the number of simultaneous data failures a storage system may experience before data may be irrevocably lost. In at least one of the various embodiments, protection level may be computed based on the amount of repair symbol information the storage system is storing for each storage unit. For example, if a storage system that employs erasure coding has ten hard drives for data storage and two hard drives for storing repair symbol information, under most arrangements the storage system would be considered to have a protection level of two.

The term "erasure coding" as used herein refers to methods for error correction/error recovery based on computing repair symbol information from storage information. The repair symbol information may be computed and stored separately from the storage information and may be employed to correct errors in the storage information that may be caused by data failure. Likewise, if the repair symbol information is lost because of a storage failure, it may be recomputed from the storage information. One of ordinary skill in the art will be familiar with one or more well-known techniques for implementing erasure coding in a computer storage system. One or more well-known erasure coding algorithms may be employed for generating repair symbol information and recovery from data failure, such as, Reed-Solomon coding, XORing, Hamming codes, or the like. Various standard, non-standard, or custom, erasure coding systems may be used, non-limiting examples include, RAID 5 or RAID 6, or the like.

The terms "data failure," or "storage failure" as used herein refer to any system or device failure that causes data stored in a storage computer to be corrupted, lost, involuntarily deleted, or otherwise damaged such that the data is unreadable or involuntarily modified. For example, if a storage system includes ten storage devices, the physical failure (breakdown) of one or more of the storage devices may be classified as a storage failure or data failure, since the information stored on the failed storage device may be inaccessible.

The term "repair" as used herein refers to actions performed to recover from one or more data failures in a storage system. If erasure coding is being employed, a repair may include reading repair symbol information and/or storage data from one or more storage devices and computing lost data using one or more erasure coding algorithms.

The term "repair event" as used herein refers to an event that represents either the occurrence of new data failure in a storage system or a completion of a repair of a previous data failure to a portion of the storage system.

The term "repair task" as used herein refers to one or more actions directed towards the repair of a data failure. The particular actions corresponding to each repair task may vary depending on the organization and/or arrangement of the storage system, and/or the nature of the data failure.

The term "repair resource" as used herein refers to one or more storage system computing resources that may be required to execute a repair task when repairing the storage system. Repair resources may include, CPU processing, network bandwidth, local bandwidth, storage device throughput, or the like. For each repair task, a portion of some or all of the different kinds of repair resources may be required for the repair task to execute.

The term "data striping," and "data stripe" as used herein refers to the one or more methods segmenting logically sequential data, such as a file such that consecutive segments of the data may be stored on different storage devices. If erasure coding is used, the data from each storage unit block in a data stripe may be employed to compute repair symbol information for the data stripe and stored on a repair symbol block. Sometimes, data striping is referred to as disk striping.

The term "task," or "task portion" as used herein refer to specific operations and/or actions that may be distributed to one or more storage computers in a storage system. Accordingly, tasks may be arranged to operate using data or information provided by the storage computer that is executing the task. This may help reduce the copying/reading of information from other storage computers. In some cases, the term task portion may be used to refer distributed tasks that are part of a larger whole task. Accordingly, the results from each task portion may contribute a final result for the task as a whole. Further, tasks may include repair tasks as discussed above.

The term "working set," or "working set information" as used herein refers to an intermediate results and/or work products that may be generated on and by the storage computers that are working on a distributed task. Some distributed tasks may generate working sets that are provided to other storage computers that then generate new working sets which may then be provided to another storage computer that is executing the same distributed task. The particular composition of a working set will depend on the type of the particular distributed task being executed.

The term "execution path" as used herein refers to a particular ordered collection of storage computers and/or storage devices that are working on a distributed task. The determination of the storage computers and/or storage devices that are included in the execution path may be based on the type of task, the requirements of the particular distributed task, one or more considerations for optimization of the performance of the distributed task, or the like. Among other things, the execution path may be used to determine an order for executing tasks and/or task portions as well as where to send the new working set.

Briefly stated, various embodiments are directed towards managing the distribution of tasks in a storage system. In at least one of the various embodiments, an execution path for one or more tasks may be generated based on the type of the task and one or more characteristic of the storage system such that the execution path includes one or more storage computers in a storage system. In at least one of the various embodiments, the type of tasks may include, a repair type, an encryption type, a decryption type, a compression type, a decompression type, or the like.

In at least one of the various embodiments, the execution path may be determined based on one or more network characteristics, including network congestion, network bandwidth, network latency, error rate, jitter, quality-of-service, throughput, or the like. Also, in at least one of the various embodiments, generating the execution path, may include determining one or more storage devices that are in the same storage computer to be included in the execution path.

Further, in at least one of the various embodiments, the tasks may be provided to each storage computer in the execution path. Accordingly, in at least one of the various embodiments, a working set of intermediate results may be generated from the tasks executing on data from the storage computer in the execution path.

Also, if there may be more than one storage computer in the execution path, working sets may be iteratively communicated to a next storage computer in the execution path such that the next storage computer employs a previously generated working set and data from the next storage computer to generate a next working set of intermediate results for the at least one task executing on the next storage computer's data until each storage computer's data in the execution path has been employed to generate each corresponding working set. In at least one of the various embodiments, the each working set may include erasure coding information that is generated as part of the execution of a storage repair task.

In at least one of the various embodiments, one or more results may be generated for the tasks based on each working set from each storage computer that may be in the execution path. In at least one of the various embodiments, the results may be stored in one or more of the storage computers in the storage system. In at least one of the various embodiments, storing the results may include employing a task to determine to store the results on a storage computer other than a storage computer in the execution path.

In at least one of the various embodiments, one or more data chunks may be provided to one or more destination storage computers and employed on each destination storage computer to generate each working set. Furthermore, In at least one of the various embodiments, if the at least one task includes one or more task portions that may be independent of the execution of other task portions, those task portions may execute as soon as the task may be obtained by each storage computer.

Illustrative Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, Storage Management Server Computer 116, Storage Computer 118, Storage Computer 120, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online) However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, storage management server computer 116, storage computer 118, storage computer 120, or other computers.

Client computers 102-105 may further be configured to include a client application that enables an end-user to log into an end-user account that may be managed by another computer, such as storage management server computer 116, storage computer 118, storage computer 120, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, storage management server computer 116, storage computer 118, storage computer 120, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of storage management server computer 116 is described in more detail below in conjunction with FIG. 3. Briefly, however, storage management server computer 116 includes virtually any network computer capable of managing data storage in network environment for one or more applications or services.

Although FIG. 1 illustrates storage management server computer 116, storage computer 118, storage computer 120 each as a single computer, the innovations and/or embodiments are not so limited. For example, one or more functions of storage management server computer 116, storage computer 118, storage computer 120, or the like, may be distributed across one or more distinct network computers. Moreover, storage management server computer 116, storage computer 118, storage computer 120 are not limited to a particular configuration such as the one shown in FIG. 1. Thus, in one embodiment, storage management server computer 116, storage computer 118, or storage computer 120 may be implemented using a plurality of network computers. In other embodiments, server computer may operate as a plurality of network computers within a cluster architecture, a peer-to-peer architecture, or the like. Further, in at least one of the various embodiments, storage management server computer 116, storage computer 118, or storage computer 120 may be implemented using one or more cloud instances in one or more cloud networks.

Also, in at least one of the various embodiments, one or more storage management server computers, or at least some or all of the features thereof, may be incorporated in a storage computer, such as, storage computer 118, or storage computer 120. Accordingly, these innovations and embodiments are not to be construed as being limited to a single environment, and other configurations, and architectures are also envisaged.

Illustrative Client Computer

Figure 2:
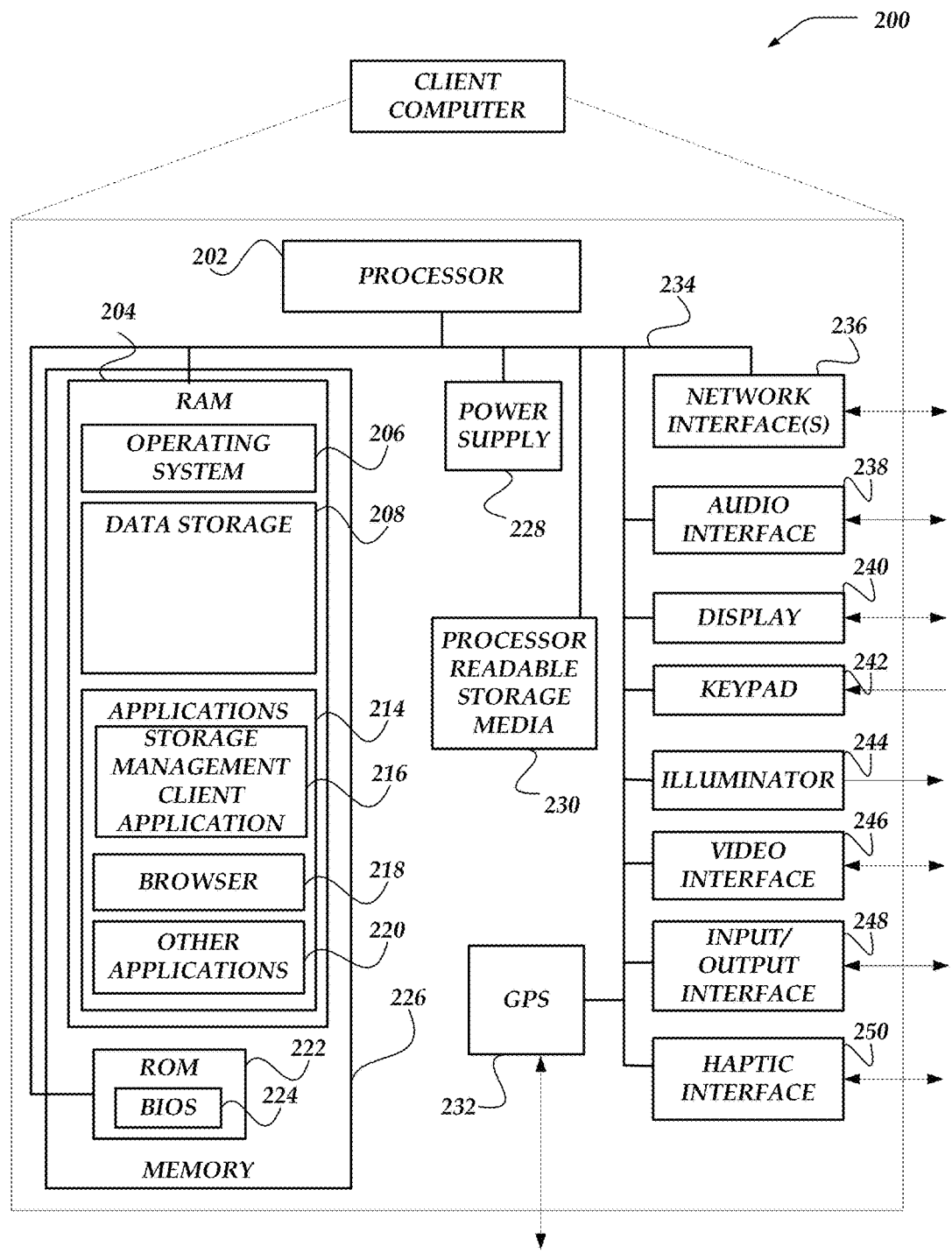
FIG. 2 shows a logical schematic embodiment of a client computer.

FIG. 2 shows one embodiment of client computer 200 that may be included in a system in accordance with at least one of the various embodiments. Client computer 200 may include many more or less components than those shown in FIG. 2. However, the components shown are sufficient to disclose an illustrative embodiment for practicing the present invention. Client computer 200 may represent, for example, one embodiment of at least one of client computers 102-105 of FIG. 1.

As shown in the figure, client computer 200 includes a processor 202 in communication with a mass memory 226 via a bus 234. In some embodiments, processor 202 may include one or more central processing units (CPU). Client computer 200 also includes a power supply 228, one or more network interfaces 236, an audio interface 238, a display 240, a keypad 242, an illuminator 244, a video interface 246, an input/output interface 248, a haptic interface 250, and a global positioning system (GPS) receiver 232.

Power supply 228 provides power to client computer 200. A rechargeable or non-rechargeable battery may be used to provide power. The power may also be provided by an external power source, such as an alternating current (AC) adapter or a powered docking cradle that supplements and/or recharges a battery.

Client computer 200 may optionally communicate with a base station (not shown), or directly with another computer. Network interface 236 includes circuitry for coupling client computer 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client computer is powered. Also, illuminator 244 may backlight these buttons in various patterns when particular actions are performed, such as dialing another client computer. Illuminator 244 may also cause light sources positioned within a transparent or translucent case of the client computer to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client computer. For example, the haptic interface 250 may be employed to vibrate client computer 200 in a particular way when another user of a computer is calling. In some embodiments, haptic interface 250 may be optional.

Client computer 200 may also include GPS transceiver 232 to determine the physical coordinates of client computer 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 232 can determine a physical location within millimeters for client computer 200; and in other cases, the determined physical location may be less precise, such as within a meter or significantly greater distances. In one embodiment, however, client computer 200 may through other components, provide other information that may be employed to determine a physical location of the computer, including for example, a Media Access Control (MAC) address, IP address, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224, or the like, for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™, or the like. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another computer based on any of a variety of events, including being sent as part of a header during a communication, sent upon request, or the like. Data storage 208 may also be employed to store social networking information including address books, buddy lists, aliases, user profile information, user credentials, or the like. Further, data storage 208 may also store messages, web page content, or any of a variety of user generated content.

At least a portion of the information stored in data storage 208 may also be stored on another component of client computer 200, including, but not limited to processor readable storage media 230, a disk drive or other computer readable storage devices (not shown) within client computer 200.

Processor readable storage media 230 may include volatile, non-transitive, non-transitory, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 230 may also be referred to herein as computer readable storage media and/or computer readable storage device.

Applications 214 may include computer executable instructions which, when executed by client computer 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client computer. Applications 214 may include, for example, a browser 218, and other applications 220. Further, applications 214 may include storage management client application 216 for integrating one or more file systems with a storage system and/or integrating with a storage management application, or the like.

Browser 218 may include virtually any application configured to receive and display graphics, text, multimedia, messages, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client computer 200 to communicate with another network computer, such as storage management server computer 116, storage computer 118, and/or storage computer 120 as shown in FIG. 1.

Other applications 220 may include, but are not limited to, calendars, search programs, email clients, IM applications, SMS applications, voice over Internet Protocol (VOIP) applications, contact managers, task managers, transcoders, database programs, word processing programs, software development tools, security applications, spreadsheet programs, games, search programs, and so forth.

Illustrative Network Computer

Figure 3:
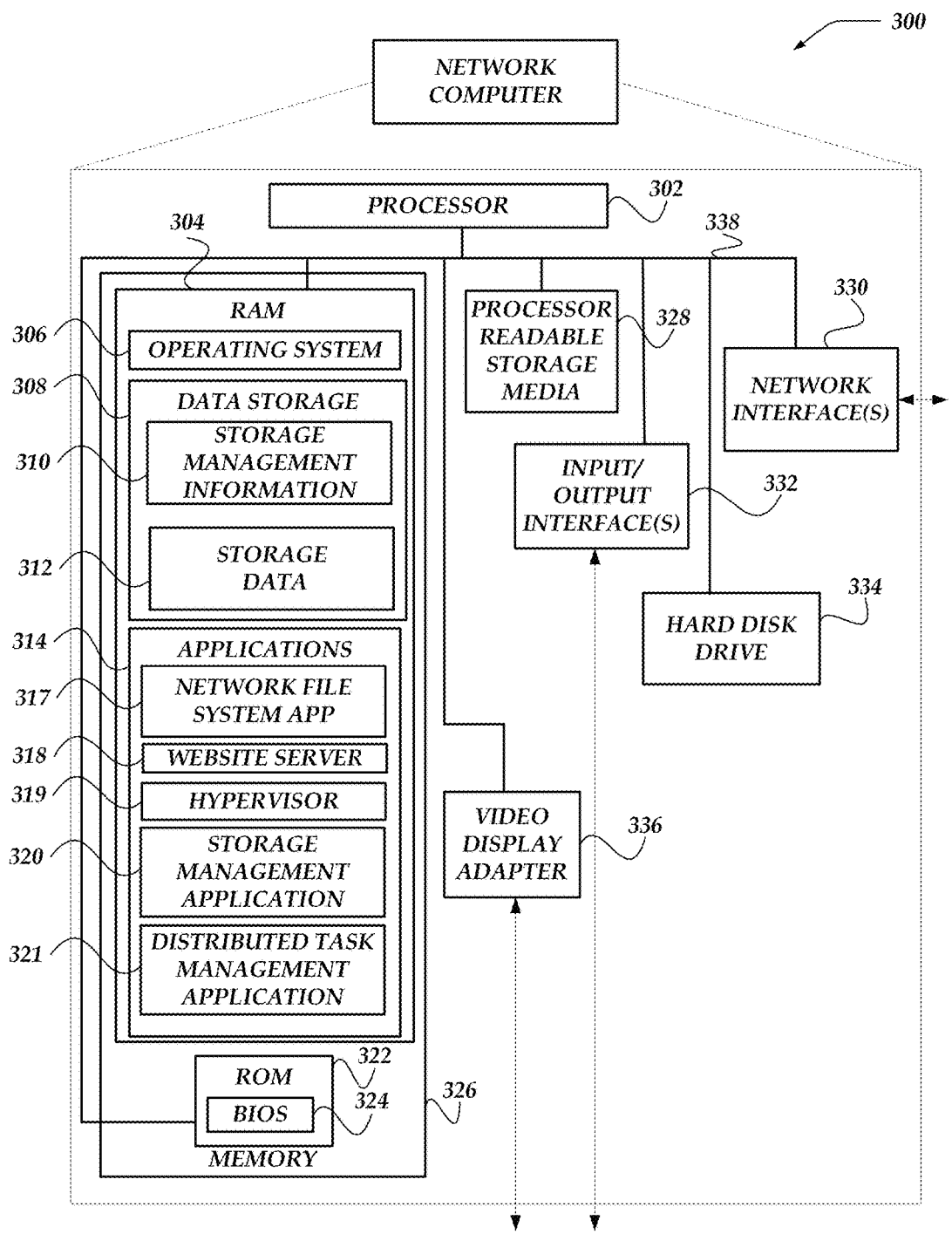
FIG. 3 illustrates a logical schematic embodiment of a network computer.

FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may be configured to operate as a server, client, peer, a host, cloud instance, or any other computer. Network computer 300 may represent, for example storage management server computer 116, and/or other network computers, such as, computers comprising, storage computer 118, or storage computer 120.

Network computer 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

As illustrated in FIG. 3, network computer 300 also can communicate with the Internet, or other communication networks, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 3. Input/output interface 332 can utilize one or more communication technologies, such as USB, infrared, NFC, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network computer 300. Any general-purpose operating system may be employed. Basic input/output system (BIOS) 324 is also provided for controlling the low-level operation of network computer 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, non-transitory, non-transitive, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computer.

Memory 326 further includes one or more data storage 308, which can be utilized by network computer 300 to store, among other things, applications 314 and/or other data. For example, data storage 308 may also be employed to store information that describes various capabilities of network computer 300. The information may then be provided to another computer based on any of a variety of events, including being sent as part of a header during a communication, sent upon request, or the like. Data storage 308 may also be employed to store messages, web page content, or the like. At least a portion of the information may also be stored on another component of network computer 300, including, but not limited to processor readable storage media 328, hard disk drive 334, or other computer readable storage medias (not shown) within network computer 300.

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In one embodiment, at least some of data store 308 might also be stored on another component of network computer 300, including, but not limited to processor-readable storage media 328, hard disk drive 334, or the like.

Further, in at least one of the various embodiments, a network computer arranged as a storage computer, such as, storage computer 118 or storage computer 120, may include one or more hard drives, optical drives, solid state storage drives or the like, for storing the data stored by a storage system.

Data storage 308 may include storage management information 310. In at least one of the various embodiments, storage management information 310 may include information, such as, storage computer/device status, repair task lists, capacity information, user profiles, or the like. Also, in at least one of the various embodiments, data storage 308 may include storage data 312 representing actual data that may be stored on a storage device and/or a storage computer.

Applications 314 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 314 may also include, network file system application 317, website server 318, hypervisor 319, storage management application 320, distributed task management application 321, or the like.

Website server 318 may represent any of a variety of information and services that are configured to provide content, including messages, over a network to another computer. Thus, website server 318 can include, for example, a web server, a File Transfer Protocol (FTP) server, a database server, a content server, email server, or the like. Website server 318 may provide the content including messages over the network using any of a variety of formats including, but not limited to WAP, HDML, WML, SGML, HTML, XML, Compact HTML (cHTML), Extensible HTML (xHTML), or the like.

Illustrative Logical Architecture

In at least one of the various embodiments, distributed task execution may be operative in a data storage system. In at least one of the various embodiments, storage computers, storage devices, or the like, may be organized into different arrangements not limited to those described below depending on the specific storage requirements of the applications and/or services that may be using the storage systems.

Figure 4:
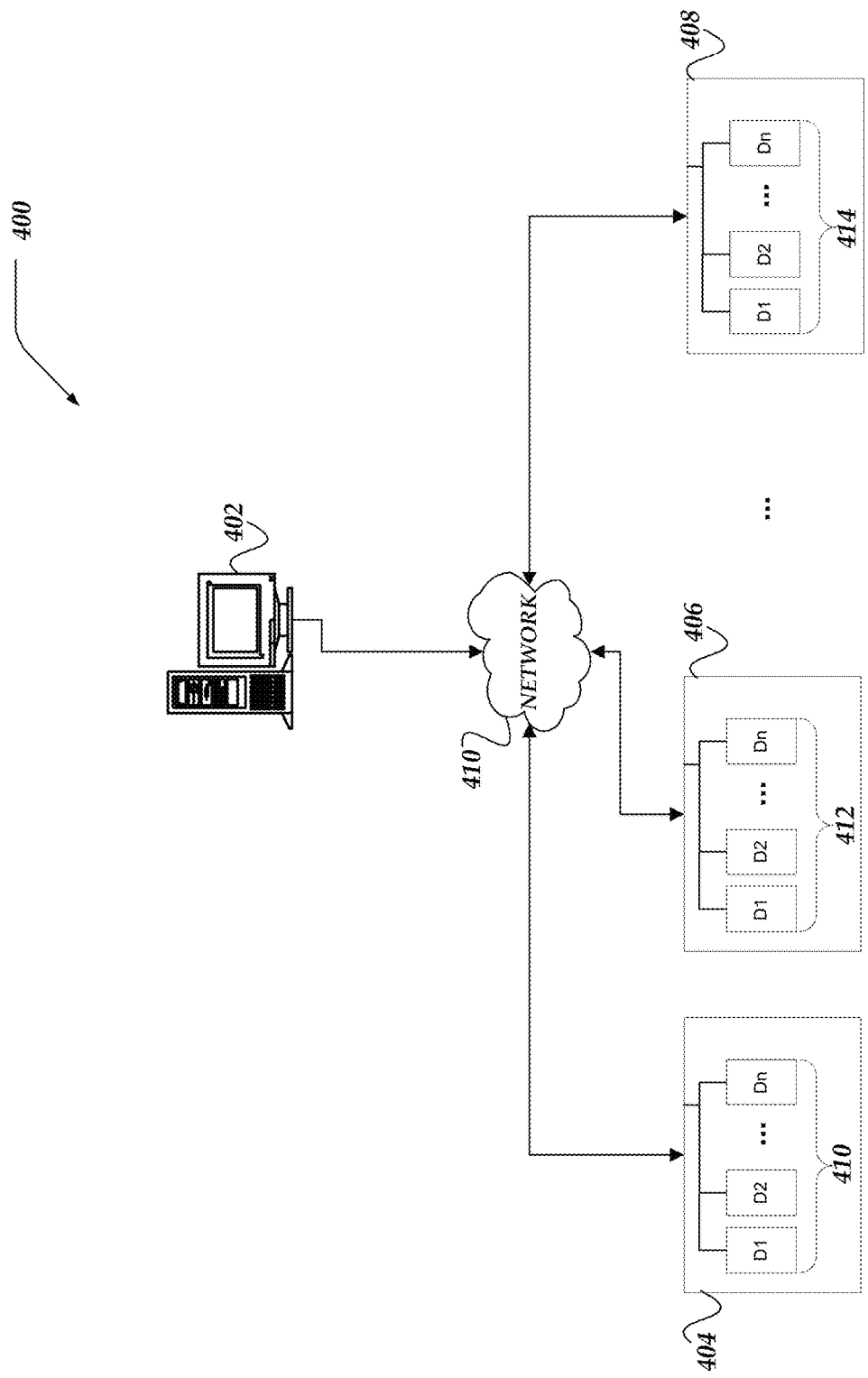
FIG. 4 illustrates a portion of a data storage system in accordance with at least one of the various embodiments.

FIG. 4 shows system 400 that is a portion of a data storage system for distributed encoding and/or distributed tasks in accordance with at least one of the various embodiments. In at least one of the various embodiments, system 400 may be comprised of a storage management server computer, such as, storage management server computer 402, as well as, one or more storage computers, such as, storage computer 404, storage computer 406, storage computer 408, or the like. In at least one of the various embodiments, storage management server computer 402, storage computer 404, storage computer 406, and/or storage computer 408, may comprise network computers, similar to network computer 300.

In at least one of the various embodiments, each computer may be interconnected over a network, such as, network 410. In at least one of the various embodiments, network 410 may be comprised similarly as wireless network 108 and/or network 110.

In at least one of the various embodiments, the storage computers may be arranged to include one or more storage devices, such as, storage devices 410, storage devices 412, or storage devices 414. In various embodiments, storage computers may include more or fewer storage devices than illustrated in FIG. 4. In at least one of the various embodiments, storage computers may include a single storage device. And, in some embodiments, one or more storage computers may be arranged to be included in an enclosure or chassis which in turn may be interconnected to other computer and/or storage computers over network 410.

In at least one of the various embodiments, the interconnections between the storage devices and the storage computers may be arranged to have a bandwidth that may be different from the bandwidth of the network connecting the storage computer to network 410. Also, in at least one of the various embodiments, among the different storage computers in system 400, some may be arranged to have different performance characteristics. Such differences may include the effective internal bandwidth of the storage computer, the external bandwidth, CPU capacity of the storage computers, storage capacity, reliability (e.g., mean-time-to-failure), protection level, or the like.

In at least one of the various embodiments, storage management server computer 402 may be arranged to include a database/inventory of the capabilities and/or performance characteristics of the storage computers, such as, storage computer 404, storage computer 406, storage computer 408, or the like. Further, in at least one of the various embodiments, a database on storage management server computer 402 may be arranged to include performance and/or characteristics information for each storage device. Also, the inventory of characteristics may include information regarding the network bandwidth and/or throughput capabilities of the different interconnections and/or components of system 400. Further, in at least one of the various embodiments, storage management server computer 402 may be arranged to monitor the performance the storage computers and initiate repairs if errors and/or data failures may be detected and/or reported.

In at least one of the various embodiments, storage management server computer 402 may be arranged to compute and/or monitor the mean-time-to-data-loss (MTTDL) for the storage devices and/or storage computers. In at least one of the various embodiments, this may entail monitoring the current protection level for each portion of the data storage system. Also, in at least one of the various embodiments, storage management server computer 402 may be arranged to monitor and track the current status of each repair task.

In at least one of the various embodiments, the functionality of storage management server computer 402 may be incorporated directly into one or more storage computers, such as, storage computer 404, storage computer 406, storage computer 408, or the like. In such embodiments a storage management application, such as, storage management application 320 may be operative on one or more of the storage computers. Further, in at least one of the various embodiments, some or all functionality of the storage management server computer may be implemented directly on each storage device. Accordingly, in at least one of the various embodiments, each storage device may be considered a storage computer. Or, alternatively, they may be considered a storage computer that includes a single storage device.

Further, in at least one of the various embodiments, storage management server computer 402 may be arranged to manage one or more distributed tasks of varying types that may be executed on the storage system. In at least one of the various embodiments, task types may include, repair tasks, erasure coding (e.g., encoding and decoding) tasks, distributed data writes, cryptographic tasks, compression tasks, decompression tasks, arbitrary compute tasks, or the like.

Figure 5A:
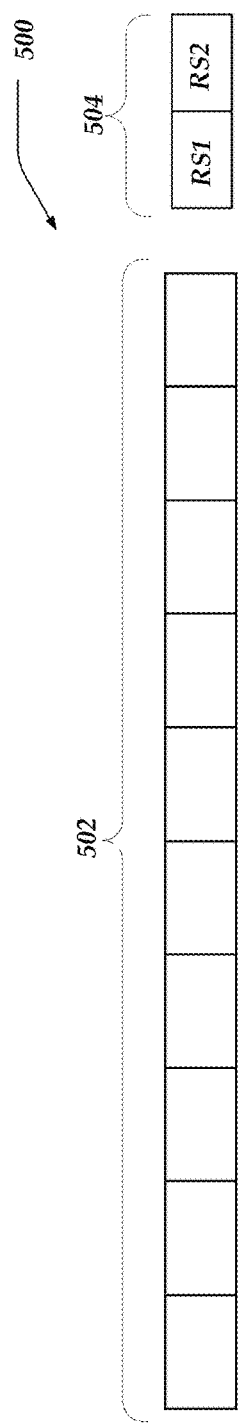
FIGS. 5A-5C illustrate portions of logical architecture of for data storage in accordance with at least one of the various embodiments.
Figure 5B:
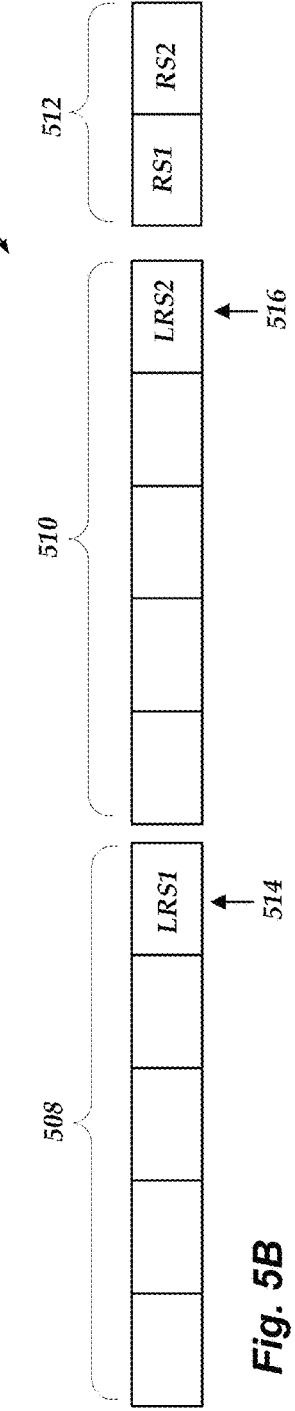
Figure 5C:
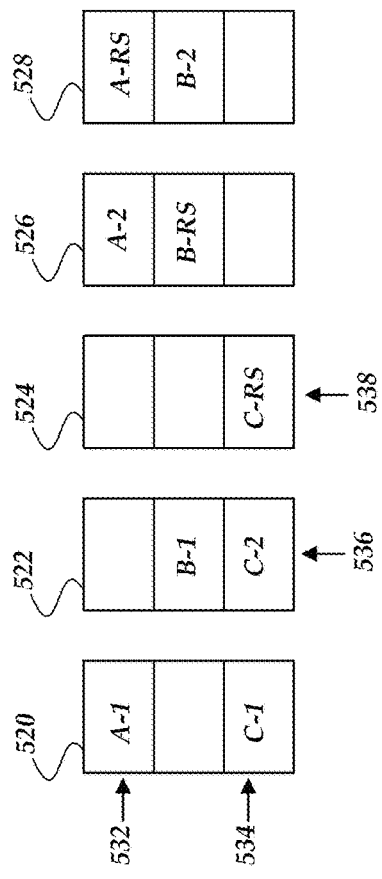

FIGS. 5A-5C illustrate portions of logical architecture of for data storage in accordance with at least one of the various embodiments. One of ordinary skill in the art will appreciate that there are various well-known ways to arrange data storage with erasure coding. Generally, erasure coding requires repair symbol information to be computed and stored in addition to the "real" information that is being stored. The repair symbol information may be used to restore data that may be lost or corrupted. In some embodiments, amount the repair symbol information stored for each storage unit (e.g., data block) corresponds to the number of simultaneous failures that may be recovered from. FIGS. 5A-5C illustrate different ways data and repair symbol information may be arranged in a data storage system. In at least one of the various embodiments, a particular set of data storage units with corresponding repair symbol storage unit may be considered to be a data stripe.

The examples illustrated with these figures are representative of a few of the different types of well-known storage arrangements where the innovations herein may be applicable. One of ordinary skill in the art will appreciate that the examples below represent a generalized discussion a few of the strategies for using erasure coding with data storage. Actual data storage embodiments may include many more or fewer components than are described herein, but these figures and their accompanying descriptions are at least sufficient to enable one of ordinary skill in the art to practice the claimed innovations.

Further, in at least one of the various embodiments, these illustrative embodiments are presented to provide context and clarification of the claimed innovations. However, the innovations are not so limited and may be employed with practically any data storage.

FIG. 5A illustrates a data storage architecture for system 500 that includes data storage units 502 that may be comprised of multiple storage units or storage devices, such as, hard drives. Also, in at least this example, there are two levels of protection provided by repair symbol units 504.

In at least one of the various embodiments, one or more well-known data striping and/or erasure coding methods may be employed to distribute data across the storage units with their corresponding repair symbol information stored in repair symbol units 504. In this example, system 500 is illustrated as having two repair symbol units which enable system 500 to recover from two simultaneous failures. Likewise, if three or more simultaneous failures occur, data may be lost because of failures may be unrecoverable using erasure coding (decoding). Note, there may be other recovery methods such as restoring from another replication store or backup of the data, but these will operate separate from the erasure coding that may be used in system 500.

In at least one of the various embodiments, system 500 may be referred to as having two levels of protection, because it has two repair symbol units enabling it to withstand two simultaneous failures. In at least one of the various embodiments, storage systems may be arranged to have more or fewer repair symbol units providing more or less protection. For example, if a storage system includes three repair symbol units it may be described as having three levels of protection because it may be able to recover from three simultaneous failures before irrevocably losing data. One or more well-known erasure coding algorithms may be employed for generating repair symbol information and recovery from data failure, such as, Reed-Solomon coding, XORing, Hamming codes, or the like.

In at least one of the various embodiments, in system 500, as data is stored it may be striped such that a portion of the data may be stored on each of storage devices 502 and computed repair symbol information for the data may be stored on each of repair symbol devices 504. In this example, such an arrangement may be referred to as 10+2 storage, indicating ten storage devices with two repair symbol devices—resulting in a protection level of two.

In at least one of the various embodiments, system 500 may be arranged to include one or more data stripes, it is illustrated herein as a single stripe for brevity and clarity. However, one of ordinary skill in the art will appreciate that embodiments having more data stripes are envisaged and that they are within the scope of the claimed innovations.

FIG. 5B illustrates a data storage architecture for system 506 that is arranged differently than system 500 described in FIG. 5A. In at least one of the various embodiments, system 506 may be arranged to support local repair and/or local repair symbol. Accordingly, in at least one of the various embodiments, the storage units may be arranged into storage groups, such as storage group 508 and storage group 510. With global repair symbol protection provided by repair symbol information stored in repair symbol units 512. Also, in at least one of the various embodiments, repair symbol information for a given storage group may be stored in storage units that may be stored local to the storage group. For example, in system 506, storage group 508 includes local repair symbol unit 514 and storage group 510 includes local repair symbol unit 516.

In at least one of the various embodiments, local repair symbol information may be used to recover from one or more failures that occur in the local group. Typically, local repair symbol information may be arranged to enable recovery from one error that may occur in its corresponding local storage group. But, in some embodiments, local repair symbol information may be arranged to enable recovery from more than one error in its corresponding local storage group.

Accordingly, in at least one of the various embodiments, if the number of simultaneous failures covered by the local repair symbol unit is exceeded, the system may fallback to rely on the global repair symbol units, such repair symbol units 512.

In at least one of the various embodiments, local repair symbol units may enable data recovery from a local storage group failure to resolve faster. For example, if a storage unit in storage group 508 experiences a failure, the recovery process may require four data reads, one read from each of the three surviving storage units in the group and one read from the local repair symbol unit to recover the data. For comparison, if one failure occurs in system 500 at least ten read operations will be required to recover the lost data—one read from each surviving storage unit, and one read from the repair symbol units. However, in system 506, if the number of failures exceed the protection level of the local repair symbol units, recovery may require reads from all surviving storage units and each global repair symbol unit.

In at least one of the various embodiments, system 506 may be arranged to include one or more data stripes, it is illustrated herein as a single stripe for brevity and clarity. However, one of ordinary skill in the art will appreciate that embodiments having one or more data stripes are envisaged and that they are within the scope of the claimed innovations.

FIG. 5C illustrates a data storage architecture for system 518 that is arranged differently than system 500 and system 506. In at least one of the various embodiments, system 518 represents a data storage system arranged to de-cluster storage blocks for a given data stripe. In at least one of the various embodiments, de-clustering implies that data stripes may be spread out among multiple storage device to mitigate the impact any given failure.

In this example, for some embodiments, storage devices, such as, storage devices 520-528 may be arranged to three partitions for holding multiple data stripes. Accordingly, since the storage devices, in this example, are arrayed five wide, with 2+1 stripes (data stripes having two storage blocks and one repair symbol block) that may be arranged to advantageously locate the storage blocks and repair symbol blocks for each data stripe to mitigate the impact of failure and/or recovery of a storage device.

In at least one of the various embodiments, block 532 represents a first storage block of Stripe A (A-1) located on storage device 520. Likewise, in this example, the second storage block for Stripe A, A-2, may be located on the storage device 526, while the repair symbol block, for stripe A, A-RS may be located on storage device 528. Likewise, in this example, data corresponding to Stripe C's first storage block may be located at block 534 (C-1), the second storage block (C-2) may be located at block 536, and its repair symbol block (C-RS) may be located at block 538. In at least one of the various embodiments, de-clustering may mitigate the impact of some data failures and/or subsequent recovery.

For example, in system 518, if storage device 526 fails, all three data blocks that it includes may be removed from service. In this example, the failure impacts Stripe A and Stripe B because the second storage block for Stripe A and the repair symbol block for Stripe B are collocated on storage device 526. During recovery the lost data, storage block B-1 located on storage device 522, and storage block B-2 located on storage device 528 are read to recover the repair symbol information for repair symbol block B-RS that was lost as result of the failure of storage device 526. In this example, the failure of storage device 526 does not impact Stripe C since all of its blocks remain intact.

Further, in some de-clustered storage arrangements, the storage blocks may be spread out such that, in some cases, recovery operations may not have any impact on some stripes. For example, if Stripe C did not share a storage device with either Stripe A or Stripe B, then Stripe C would be even less impacted by the failure of storage device 526.

In at least one of the various embodiments, system 518 may be arranged to include more or fewer data stripes, as illustrated herein. Accordingly, one of ordinary skill in the art will appreciate that embodiments having more or fewer data stripes are envisaged and that they are within the scope of the claimed innovations.

FIGS. 6A and 6B illustrate a logical schematic for storage system 600 that may be arranged to employ distributed task execution in accordance with at least one the various embodiments. FIG. 6A illustrates a logical schematic for storage system 600 at the beginning stages of storing data in accordance with at least one of the various embodiments. Accordingly, computer 602 may be a client computer, such as client computer 200, or a network computer, such as, network computer 300, upon which a user or application may have initiated a storage operation. Data blob 604 may represent that data being stored. In at least one of the various embodiments, data blob 604 may be a file containing data for storage.

In at least one of the various embodiments, computer 602 may include a network file system application, such as, network file system 317. In at least one of the various embodiments, network file system application 317 may be arranged to integrate with storage management application 320. Accordingly, in at least one of the various embodiments, the storage management application may be arranged to split data blob 604 into multiple data chunks for distribution over a network to one or more storage computers, such as, storage computer 606, storage computer 608, and/or storage computer 610.

FIG. 6B illustrates a logical schematic of for storage system 600 for the execution of distributed encoding in accordance with at least one of the various embodiments. In some embodiments, erasure coding may be employed to generate repair symbol information to protect for the information included include in data blob 604. In storage system 600, in at least one of the various embodiments, each storage computer may be arranged include a CPU complex that enables the storage computer to perform various distributed compute tasks, such as, erasure coding. For example, in at least one of the various embodiments, storage computer 606 may receive one data chunk from data blob 604 and perform a compute task on the data chunk. A working set, such as working set 612, may be generated that includes the result of the computing performed on storage computer 606. Working set 612 may be provided over a network to another storage computer, such as, storage computer 608.

Accordingly, storage computer 608 may be arranged to receive the working set from storage computer 606 and perform one or more compute tasks. Such compute tasks may include using information included in working set 612 and transforming it based on the data chunk of data blob 604 that is stored on storage computer 608. At least one type of transform may be an erasure coding transform resulting in another working set such as working set 614. In some embodiments, some or all of working set 614 may be stored and/or provided to another storage computer, such as, storage computer 610. Accordingly, in at least one of the various embodiments, working set 616 may represent the results of transforms performed previously on the other storage computers. Likewise, working set 616 may be further transformed based on the data chunk of data blob 604 that is stored on storage computer 610 to produce another working set, such as, working 618. Some or all working set 618 may be stored in storage computer 610 and some or all of it may be propagated to another storage computer if there are more transforms to executes, or if the transforms are finished it may be stored at a designated location in the storage system.

For example, in at least one of the various embodiments, storage system 600 may be arranged to implement distributed erasure coding. Accordingly, rather than requiring a single computer, such as, storage management server computer 402 received the entire data blob and compute the repair symbol information, the data blob may be chunked and provided to one or more storage computers. Thus, in at least one of the various embodiments, a portion of the erasure coding computation may be performed at each storage computer with the working set passed to the next storage computer. Likewise, for repair storage failures, repair tasks may be distributed to avoid having to read and copy the entirety of a data stripe into a single CPU complex (e.g., storage management server computer) to perform the computations necessary to recover the lost data.

Moreover, in at least one of the various embodiments, if the distributed task, such as, most erasure coding tasks, may have associative properties, such that an application, such as, storage management application 320, and/or distributed task management application 321 may be arranged to determine the order of operation/execution for the tasks. Accordingly, in at least one of the various embodiments, the order of operations may be optimized based on various factors, such as, network bandwidth, local bandwidth, storage device throughput, available CPU processing, or the like. See, FIG. 9.

Furthermore, in at least one of the various embodiments, one or more compute tasks, including erasure coding tasks may be distributed for concurrent/parallel execution. Also, in some cases, portions of a distributed task may be executed concurrently. For example, in at least one of the various embodiments, different portions of data blob 604 may be simultaneously provided to each storage computer associated with the task. Accordingly, in this example, each storage computer may concurrently generate one or more data blocks that may be combined with a later provided working set. Also, in at least one of the various embodiments, storage computers associated with a task may concurrently generate working sets that may be combined and/or aggregated into a final result. In addition, in at least one of the various embodiments, one or more distributed tasks of the same or different type may be executed or otherwise in process at the same time.

Figure 7:
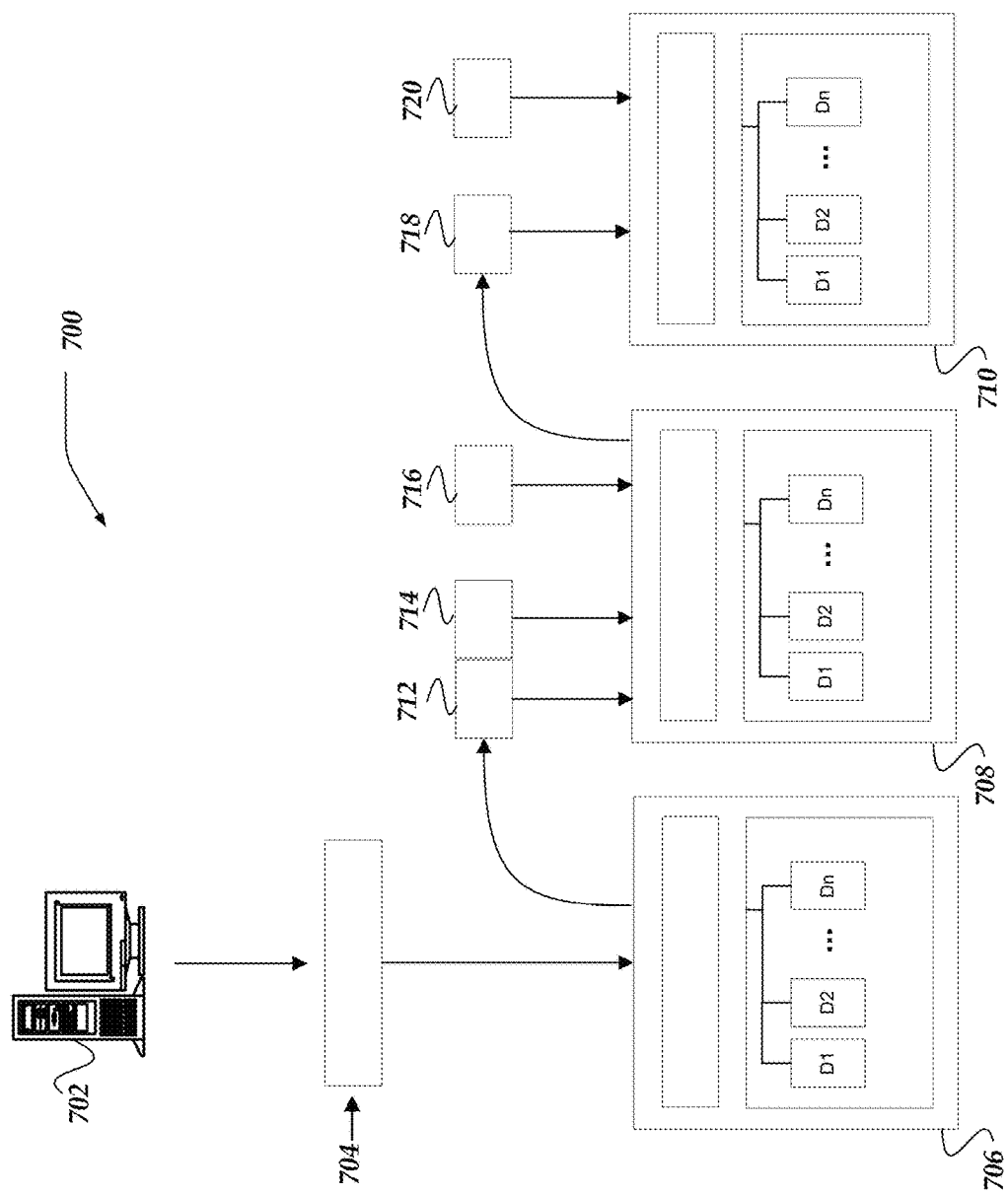
FIG. 7 illustrates a logical schematic of a storage system for the execution of distributed tasks in accordance with at least one of the various embodiments.

FIG. 7 illustrates a logical schematic of for storage system 700 for the execution of distributed encoding tasks in accordance with at least one of the various embodiments. In this example, computer 702 may be providing data blob 704 for storage on a storage system.

In at least one of the various embodiments, computer 702 may include a network file system application, such as, network file system 317. In at least one of the various embodiments, network file system application 317 may be arranged to integrate with storage management application 320. Accordingly, in at least one of the various embodiments, a storage management application operative on computer 702 may be arranged to determine a storage computer, such as, storage computer 706 that may be provided data blob 704 over a network. In at least one of the various embodiments, storage computer 706 may be arranged to operate in a dual-role of storage management server computer and storage computer.

In at least one of the various embodiments, upon receiving data blob 704, a storage management application and/or distributed task management application, may divide data blob 704 into one or more chunks to conform to the data stripe arrangement of storage system 700. Also, a first chunk may be stored at storage computer 706 and one or more tasks, such as erasure encoding may be performed on the data chunk stored on storage computer 706.

Also, in at least one of the various embodiments, storage computer 706 may be arranged to communicate the other data chunks, such as, data chunk 712 and data chunk 714, of data blob 704 to another storage computer, such as, storage computer 708. Also, storage computer 706 may communicate a working set, such as, working set 716 to storage computer 708. Accordingly, in at least one of the various embodiments, storage computer 708 may be arranged to store one of the data chunks, such as, data chunk 712, and generate a new working set from data chunk 712 and working set 716. For example, the new working set may be generated by a transform associated with an erasure coding algorithm, or the like.

Further, the remaining data chunks, data chunk 718, in this example, may be transferred to storage computer 710 along with the new working set, working set 720. And, in at least one of the various embodiments, storage computer 710, may store data chunk 718 and generate another working set from working set 720. In at least one of the various embodiments, the operation will continue above until all of the data chunks from data blob 704 have been distributed and any distributed tasks have been completed—including the generation and storing of repair symbol information.

Figure 8:
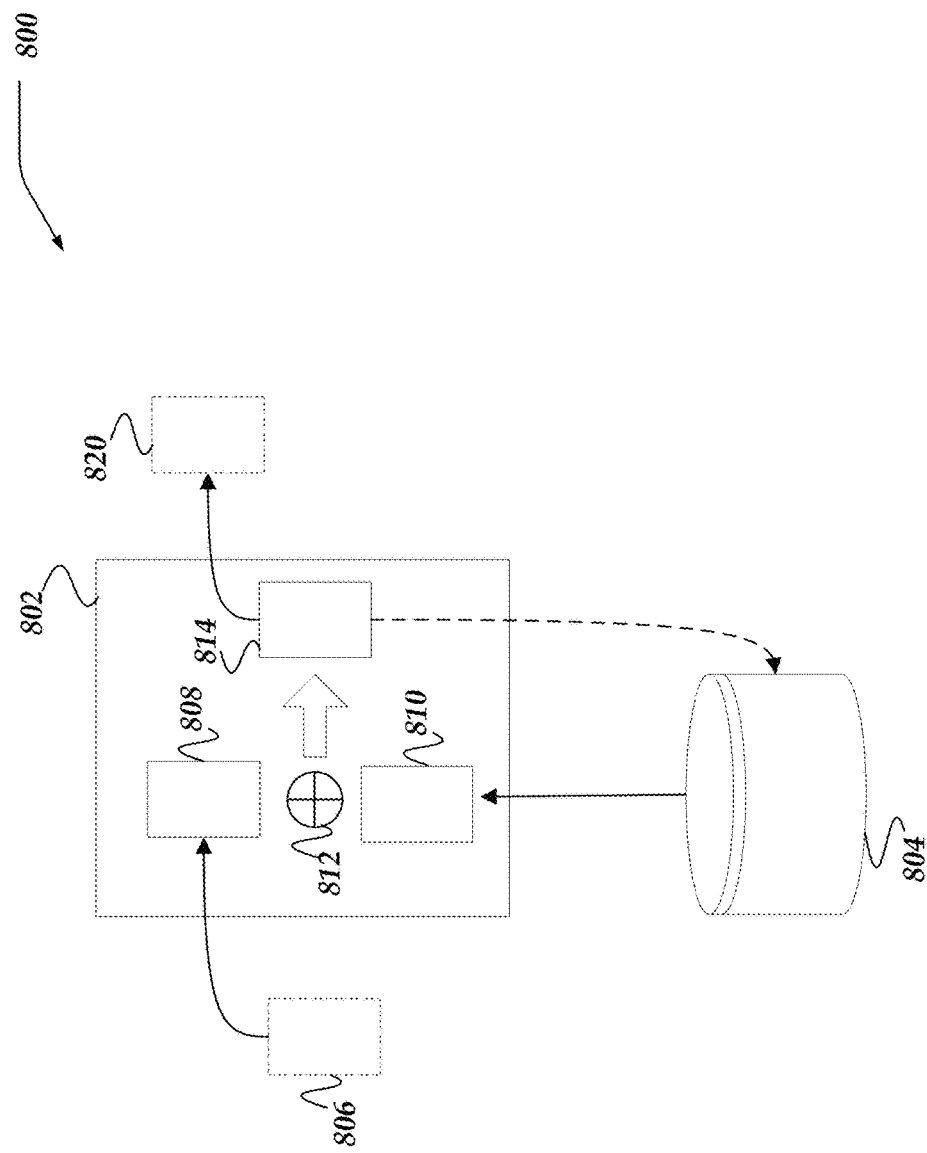
FIG. 8 illustrates a logical schematic for a portion of a storage system in accordance with at least one of the various embodiments.

FIG. 8 illustrates a logical schematic for a portion of storage system 800 in accordance with at least one of the various embodiments. FIG. 8 helps illustrate the execution of a portion of a distributed task on a single storage computer that may be part of a larger collection of storage computers in a storage system. In at least one of the various embodiments, a CPU complex, such as CPU complex 802 that may be part of a storage computer may be associated with one or more storage devices, such as, storage device 804. In at least one of the various embodiments, CPU complex 802 and storage device 804 may be integrated into a single unit pair having one CPU complex and one storage device. In other embodiments, CPU complex 802 may be integrated and/or interconnected with several storage devices (not shown) in addition to storage device 804.

In at least one of the various embodiments, a data block containing working set information, such as, data block 806 may be provided to CPU complex 802. In this example, data block 806 may be provided by another storage computer, a storage management server computer, or the like. In some cases, CPU complex 802 may be associated with the first storage computer in a data stripe and/or otherwise the first computer to begin execution of a distributed task. If this is the case, there may not be a data block 806 that includes working set information provided from another computer—accordingly, data block 806 is represented in this example with a dashed line.

In at least one of the various embodiments, CPU complex 802 may be arranged to transform working set 808 using one or more transformation algorithms, represented by transform 812, to perform computations on working set 808 and one or more data blocks retrieved from storage device 804, such as, data block 810. In at least one of the various embodiments, the execution of transform 812 may generate a new working set, such as, working set 814. In at least one of the various embodiments, working set 814 may be forwarded to another storage computer as working set 820. Or, in at least one of the various embodiments, working set 814, or a portion of working set 814 may be stored back to storage device 804. Also, in at least one of the various embodiments, if CPU complex 802 performs a final step of a distributed task, it may be arranged to store the last result and/or working set at another storage computer.

In at least one of the various embodiments, transform 812 may represent a computation or other processing action that corresponds to the particular distributed task that is being executed. In some embodiments, the distributed task may be a repair task that is regenerating a data block using erasure coding. Other distributed tasks, may include generating a cryptographic hash, compression, decompression, or the like. In at least one of the various embodiments, distributed tasks of varying types may be executed on the storage system. In at least one of the various embodiments, task types may include, repair tasks, erasure coding (e.g., encoding and decoding) tasks, distributed data writes, cryptographic tasks, compression tasks, decompression tasks, arbitrary compute tasks, or the like.

In at least one of the various embodiments, a storage computer that includes CPU complex 802 may be arranged to execute computer programs or other computer instructions that otherwise define the particular operations that are associated with transform 812. These instructions may be defined in hardware circuitry, firmware, software, or the like. Accordingly, in at least one of the various embodiments, CPU complex 802 may be arranged to execute different instructions and/or operations for transform 812 depending on the particular distributed task and/or the composition of the data being processed.

Figure 9:
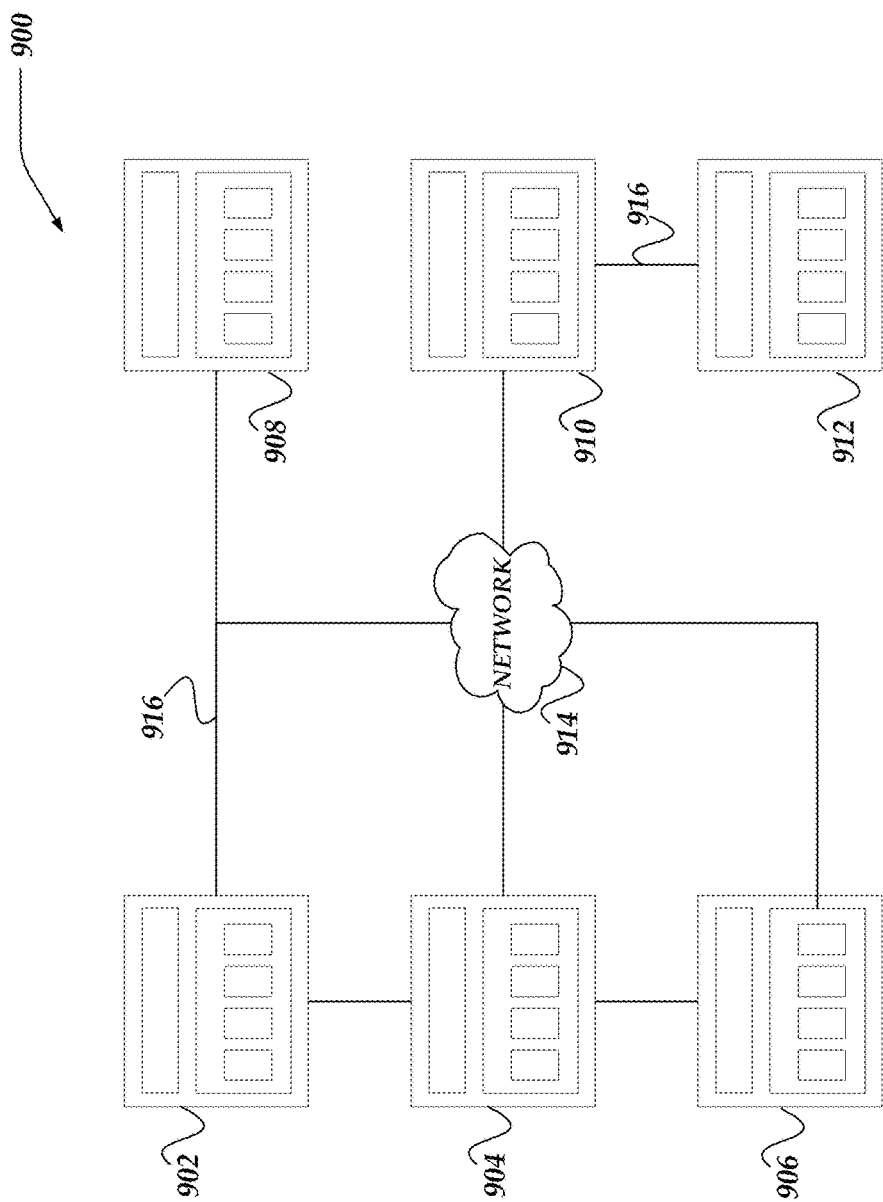
FIG. 9 illustrates a logical schematic of a storage system that is in accordance with at least one of the various embodiments.

FIG. 9 illustrates a logical schematic of storage system 900 that is in accordance with at least one of the various embodiments. FIG. 9 and storage system 900 represents a storage system that may be used to describe non-limiting examples of distributed task execution and/or execution path optimization.

In this example, in at least one of the various embodiments, storage system 900 comprises multiple storage computers interconnected by a combination local high-speed networks (e.g., networks 916) and a slower wide-area network (e.g., network 914). Accordingly, in this example, storage computer 902, storage computer 904, storage computer 906, and storage computer 908 are interconnected to each other with a local area high speed network represented by network 916. Likewise, in this example, storage computer 910 and storage computer 912 are interconnected similarly. Further, in this example, storage computer 910 and storage computer 912 are connected to the other storage computers in system 900 over low-speed network 914. Accordingly, in this example, the network bandwidth between one or more of the storage computers may vary depending on the particular storage computers that are under consideration. Thus, in at least one of the various embodiments, a storage management application, such as, storage management application 320, and/or distributed task management application 321, may be arranged to determine task distribution paths that may be optimized for the topology of the networks used by a storage system.

In this example, for at least one of the various embodiments, performance may be optimized by limiting the amount times the distribution/execution path traverses the slower network, represented by network 914. Accordingly, if a repair task involves data processing on all six storage computers, the order in which the repair task is performed may impact the performance. If for this example, the repair task is considered to be associative, in the sense that the distributed portions of the task may be completed in any order, the order the tasks may be determined to improve performance.

For example, a repair task performed in the following order: storage computer 902, storage computer 910, storage computer 904, storage computer 912, storage computer 906, and finally, storage computer 908 will have traversed the slow network, network 914, four times. In contrast, a repair task performed in a different order, such as, storage computer 908, storage computer 902, storage computer 904, storage computer 906, storage computer 910, and finally, storage computer 912 may only traverse the slow network, network 914 once. Thus, it is apparent that in this example the order that the distributed tasks are executed among the constituent storage computers may impact the performance of the storage system and the performance of the task.

In at least one of the various embodiments, additional system characteristics, such as, the performance characteristics of individual storage computers may also be considered. Also, the flexibility in the execution path determination may vary depending on the type of task being performed. For example, tasks that include more associative operations may have more flexibility in how the task may be distributed because the order of operation may not be important. Whereas, other tasks may require a fixed sequence of operations that may rigidly define the distribution path of the task. In at least one of the various embodiments, repair tasks for erasure coding are often associative. Accordingly, a storage management application may be arranged to employ one or more optimization strategies to determine efficient ordering of distributed repair tasks. Such well-known optimizations may include one or more constrained shortest path algorithms, such as, ant colony optimization algorithms, branch and bound algorithms, stochastic methods, heuristics, or the like, or combination thereof.

In at least one of the various embodiments, storage management applications may be arranged to employ optimization strategies that take into account a variety of other characteristics of the storage system in addition to network topology, such as, CPU capabilities, CPU load/utilization, task prioritization, network topology, network performance characteristics or the like, or combination thereof.

Figure 10:
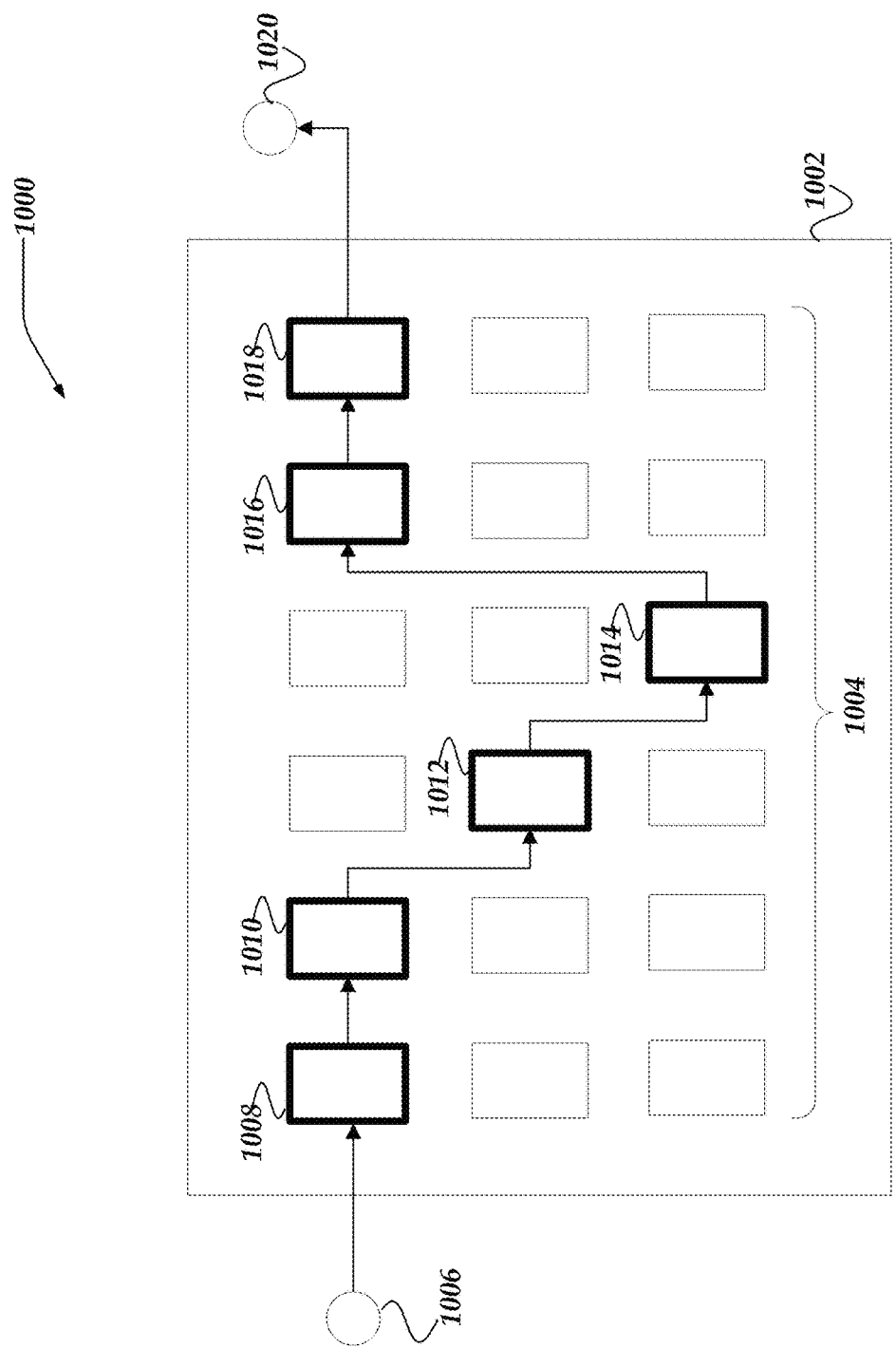
FIG. 10 illustrates a logical schematic of a storage computer that includes multiple storage devices in accordance with at least one of the various embodiments.

FIG. 10 illustrates a logical schematic of storage computer 1000 that include multiple storage devices in accordance with at least one of the various embodiments. In at least one of the various embodiments, chassis 1002 may include storage devices 1004 representing eighteen storage devices in this example. Also, in at least one of the various embodiments, storage devices 1004 may be individual storage computers included in a single chassis rather than just being storage devices, where each storage computer may be comprised of at least a CPU complex and a storage device.

In at least one of the various embodiments, input port 1006 may represent an incoming communication port that enables communication over a network. Likewise, output port 1020 may represent an outgoing communication port that enables further communication over a network. In some embodiments, input port 1006 and output port 1020 may be arranged to use one or more separate or shared physical network interfaces, such as, network interface 330.

In at least one of the various embodiments, a storage management application, or a distributed task management application, such as, storage management application 320 or distributed task management 321 application may be arranged to determine a distributed path within a storage computer or storage computer chassis, such as chassis 1002. Accordingly, the path may be determined to optimize the performance of the task as well as to minimize the impact of the task on other storage devices or storage computers. (See, path optimization discussion above.) In the example shown in FIG. 10, a distributed path is determined as follows: working set information may be received over input port 1006 and provided in order to storage device 1008, storage device 1012, storage device 1014, storage device 1016, and storage device 1018. Further, after each storage device in the path has been accounted for, the resulting working set may be communicated to the next destination over output port 1020.

In at least one of the various embodiments, a storage computer integral to chassis 1002 may be employed to manage providing the working set to each storage device in the correct order based on the execution path. However, in at least one of the various embodiments, as mentioned, each of storage devices 1004 may be coupled to an individual and dedicated storage computer that includes its own CPU complex for executing a portion of the task on the working set.

In at least one of the various embodiments, the constituent storage devices and/or storage computers that comprise the determined execution path may be constrained by the type of task and/or the layout of the data in the storage system as it relates to erasure coding and/or protection levels.

Generalized Operation

FIGS. 11-15 represent the generalized operation for distributed task in accordance with at least one of the various embodiments. In at least one of the various embodiments, processes 1100, 1200, 1300, 1400, and 1500 described in conjunction with FIGS. 11-15 may be implemented by and/or executed on a single network computer, such as network computer 300 of FIG. 3. In other embodiments, these processes, or portions thereof, may be implemented by and/or executed on a plurality of network computers, such as network computer 300 of FIG. 3. In yet other embodiments, these processes, or portions thereof, may be implemented by and/or executed on one or more virtualized computer, such as, those in a cloud-based environment. However, embodiments are not so limited and various combinations of network computers, client computers, or the like may be utilized. Further, in at least one of the various embodiments, the processes described in conjunction with FIGS. 11-15 may be operative in storage systems and/or architectures such as those described in conjunction with FIGS. 4-10.

Figure 11:
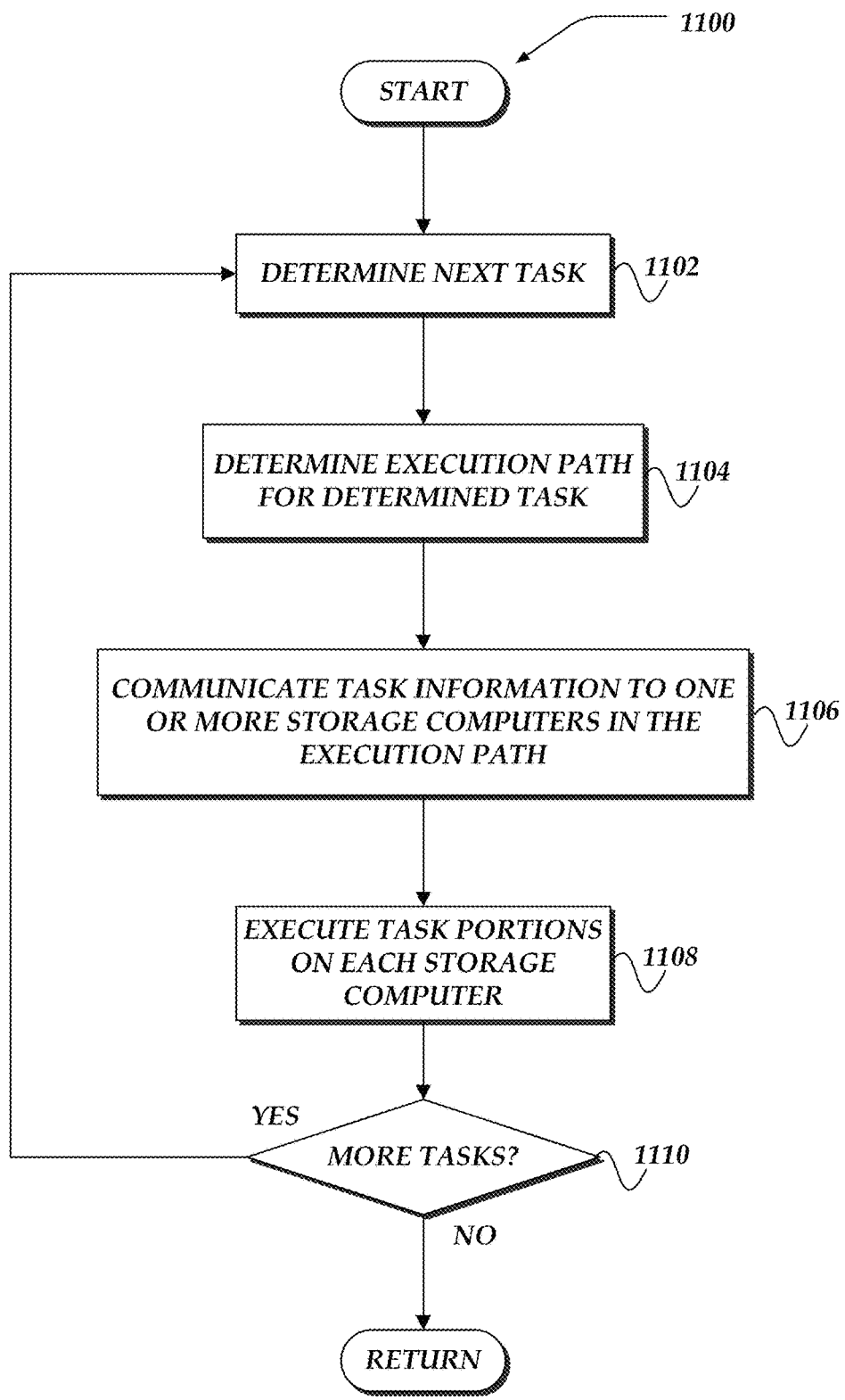
FIG. 11 shows an overview flowchart for a process for distributed execution of tasks in a storage system in accordance with at least one of the various embodiments.

FIG. 11 shows an overview flowchart for process 1100 for distributed execution of tasks in a storage system in accordance with at least one of the various embodiments. After a start block, at block 1102, one or more next tasks may be determined for distributed execution. In at least one of the various embodiments, tasks may include a variety of tasks that may be distributed to one or more storage computers and/or storage devices for execution. For example, a task may be repair task that may include operations and/or instructions for repairing information in the storage system using erasure coding techniques. In at least one of the various embodiments, tasks may include a write operation for writing large files to the storage system. In at least one of the various embodiments, a storage management application, or a distributed task management application, may be arranged to determine the particular task execution based on various strategies, such as, task schedules, prioritization of the tasks, user input/intervention, or the like.

In at least one of the various embodiments, two or more tasks may be determined for concurrent (e.g., simultaneous, parallel, or the like) execution. Accordingly, in at least one of the various embodiments, there is no requirement for one particular task to finish before starting another task. Thus, one or more instances of process 1100 may be in progress at any given time.

At block 1104, in at least one of the various embodiments, an execution path from among one or more storage computers and/or one or more storage devices may be determined for the determined task. In at least one of the various embodiments, as discussed, process 1100 may be arranged to determine an execution path that includes one or more storage computers based on one or more path optimization strategies that are consistent with the operation of the distributed task based on the particular arrangement of the task and its purpose.

In at least one of the various embodiments, execution paths may include one or more parallel portions of the path that enable data delivery and task execution to occur in parallel on different storage computers. For example, in at least one of the various embodiments, a distributed task may be arranged to provide a portion of a data blob to multiple storage computers. Accordingly, the execution path may include a step that simultaneously provides the data blob portions to each of the multiple storage computers.

At block 1106, in at least one of the various embodiments, information for executing the determined task may be communicated to one or more of the storage computers in the execution path. In at least one of the various embodiments, a storage management application or distributed task management application may be arranged to communicate task information over a network to one or more storage computers that may comprise the execution path. In at least one of the various embodiments, this information may include data, command information, storage location information, erasure coding information, or the like. The particular information communicated to each storage computer may vary depending on the particular task being executed and the role a particular storage computer may perform for the task. For example, if the task is a write operation, the information may include, the data that is being written to storage, address information regarding where to locate the data, permission/access control information, execution path members, other well-known file-system meta data, or the like, or combination thereof.

Also, for example, in at least one of the various embodiments, information associated with a distributed repair task may include information relevant to the repair, such as, parameters associated with the data block(s) that are undergoing repair, execution path information, priority information, or the like, or combination thereof. Further, for example, in at least one of the various embodiments, in addition to the information discussed above, a distributed cryptographic operation, may include a working set seeded with information for performing the cryptographic operation, or the like. In at least one of the various embodiments, distributed tasks of varying types that may be executed on the storage system. In at least one of the various embodiments, task types may include, repair tasks, erasure coding (e.g., encoding and decoding) tasks, distributed data writes, cryptographic tasks, compression tasks, decompression tasks, arbitrary compute tasks, or the like.

At block 1108, in at least one of the various embodiments, the tasks and/or task portions may be executed on each storage computer. In at least one of the various embodiments, upon the conditions for their execution being met, the tasks or the task portion may be executed on the each of the storage computers comprising the execution path. In at least one of the various embodiments, if a task portion does not have dependencies related to the completion other task portions, some tasks may execute as soon as the task information for the task portion is received at a storage computer. Likewise, in at least one of the various embodiments, some tasks and/or task portions may be arranged to execute in parallel with other tasks and/or task portions.

In at least one of the various embodiments, a storage computer may be arranged to communicate status information related to a task and/or task portion to a storage management application or a distributed task management application. Such status information may include success/fail reports, error codes, result set information, or the like, or combination thereof. Accordingly, in at least one of the various embodiments, a storage management application or distributed task management application may be arranged to monitor and/or track the performance and/or completion status of the overall distributed task. Thus, in at least one of the various embodiments, if a current distributed task is suspended, it may be restarted based on the amount of work that may be remaining. At decision block 1110, in at least one of the various embodiments, if more tasks remain may be available for execution, control may loop back to block 1102; otherwise, control may be returned to a calling process.

In at least one of the various embodiments, the actions of process 1100 may be performed in parallel for two or more tasks. In at least one of the various embodiments, parallel actions for two more tasks may occur in the same instance of process 1100 or in different instances of process 1100.

Figure 12:
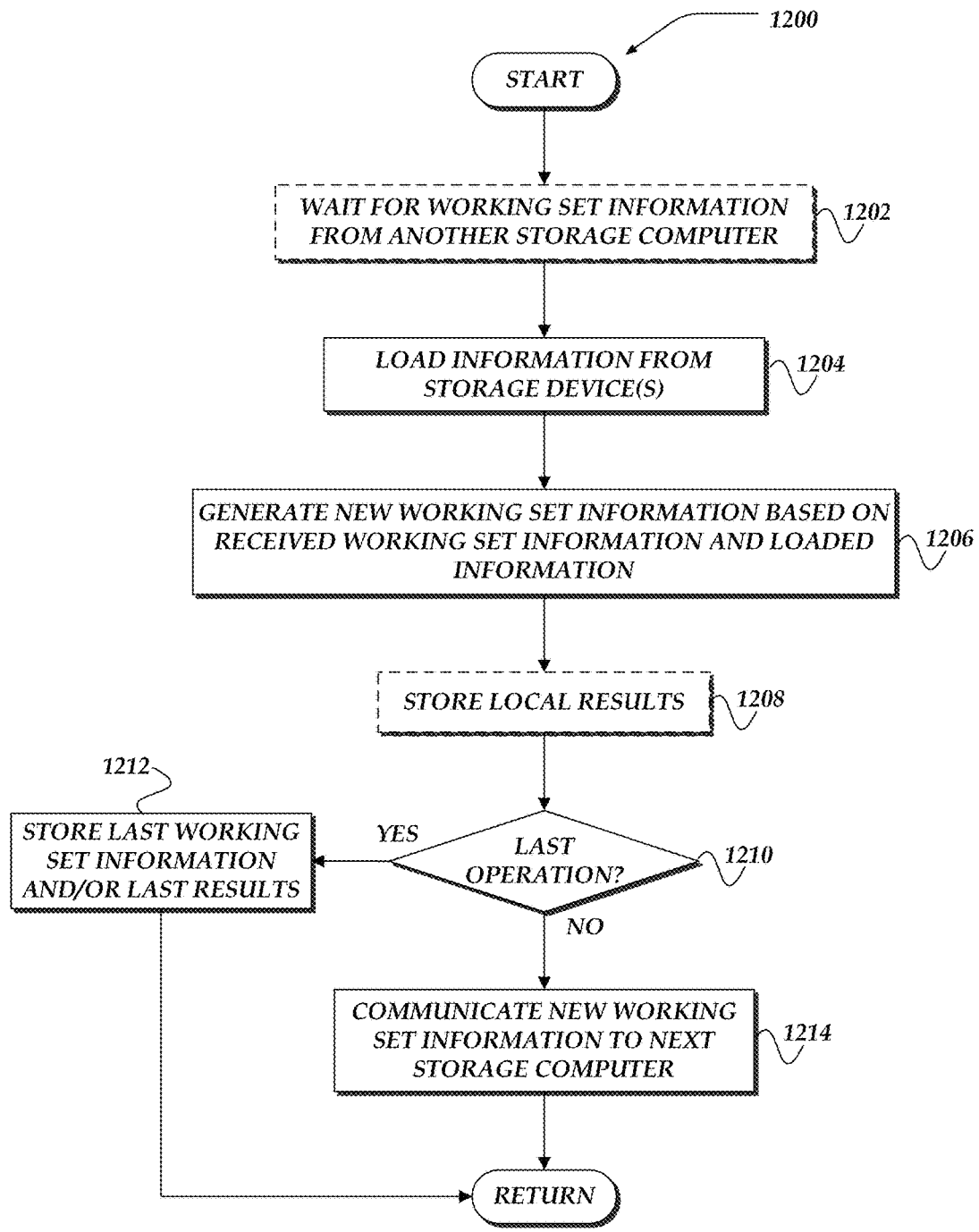
FIG. 12 illustrates an overview flowchart for a process for executing portions of a distributed task on a storage computer in accordance with at least one the various embodiments.

FIG. 12 illustrates an overview flowchart for process 1200 for executing portions of a distributed task on a storage computer in accordance with at least one the various embodiments. After a start block, at block 1202, in at least one of the various embodiments, optionally, process 1200 may be arranged to wait for working set information to be provided. In at least one of the various embodiments, a distributed task, such as, a erasure coding task, cryptographic task, compression task, or the like, may be arranged to accept working set information from a previously executed portion of the task. Accordingly, such tasks may require process 1200 to wait until the necessary working set information is provided. However, in at least one of the various embodiments, process 1200 and/or other instances of process 1200 may be arranged to execute other tasks and/or task portions if computing resources may be available.

At block 1204, in at least one of the various embodiments, information relevant to the current task portion being executed may be loaded or otherwise retrieved from one or more storage devices associated with the storage computer. In at least one of the various embodiments, the provided task information may include address/identity information for determine which data block to retrieve from the storage device. (See, FIG. 8.) In at least one of the various embodiments, the storage device may be accessed over a local network or data bus, or in other cases, it may be accessed over a network such as network 108, or network 110.

At block 1206, in at least one of the various embodiments, new working set information may be generated based on the received working set information and the information loaded from the storage device. In at least one of the various embodiments, the new working set information may be generated by the execution of a transform operation that takes the loaded information and the provided working set as inputs. The particular transform operation may be specific to the particular distributed task and/or task portion that is being executed. (See, FIG. 8.)

At block 1208, in at least one of the various embodiments, optionally, information associated with one or more results that may have been generated in block 1206 may be stored on the one or more storage devices associated with the current storage computer. In at least one of the various embodiments, some distributed tasks, such as, distributed write operations, may be arranged to store data information and/or working set information on the storage device that is local to the current portion of the task that is being executed.

In at least one of the various embodiments, some distributed tasks, such as, some repair tasks, may not include storing information on the local storage device.

At decision block 1210, in at least one of the various embodiments, if the current operation is the last portion of the task for execution, control may flow to block 1212; otherwise, control may flow to block 1214. As discussed above, in at least one of the various embodiments, a distributed task may be comprised of an additive or multiplicative operation that carries information (working sets) from one storage computer to another. Accordingly, for some distributed tasks, the final operation may include additional steps that may be unique to the final operation. Thus, in at least one of the various embodiments, the storage computer that is directed to execute a last or final portion of a distributed task may be directed to perform additional steps.

At block 1212, in at least one of the various embodiments, in accordance with the task being performed, information that includes and/or is associated with the last working set information and/or final result information may be stored onto a storage device. In at least one of the various embodiments, since the storage computer is performing the last portion of the distributed task, there may be additional operations to perform that relate to the completion of the distributed task. For example, in at least one of the various embodiments, the result of a distributed repair task may include one or more recovered and/or regenerated data blocks. Accordingly, in this example, the last storage computer may be directed to store the recovered data block to another storage computer that may correspond to the proper location for the recovered data block.

At block 1214, in at least one of the various embodiments, since the current distributed task is not finished, the new working set information may be communicated to another storage computer. In at least one of the various embodiments, task information communicated to a storage computer may include information for determining which storage computer should be provided the working set information and/or data information (if any). For example, the task information may include a network address, or other location information for the next storage computer in the execution path.

In at least one of the various embodiments, some distributed tasks may not generate working set information or otherwise provide information to another storage computer. If so, the task may not send working set information to another storage computer.

Further, in at least one of the various embodiments, depending on the distributed task, the storage computer may communicate information to a storage management application or a distributed task management application. In at least one of the various embodiments, status information may include success/fail reports, error codes, result set information, or the like, or combination thereof. Next, in at least one of the various embodiments, control may be returned to a calling process.

In at least one of the various embodiments, the actions of process 1200 may be performed in parallel for two or more tasks. In at least one of the various embodiments, parallel actions for two more tasks may occur in the same instance of process 1200 or in different instances of process 1200.

Figure 13:
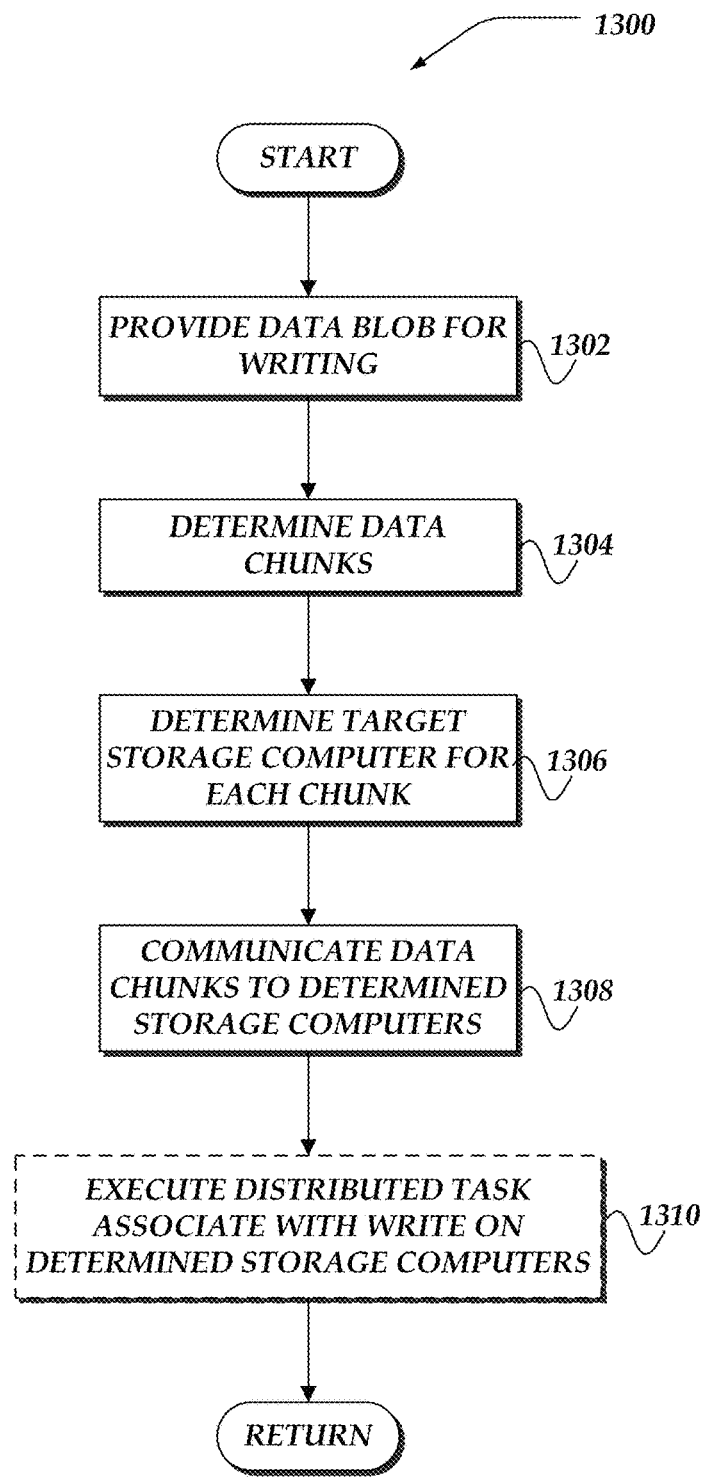
FIG. 13 illustrates an overview flowchart for a process for executing a distribute write task in accordance with at least one of the various embodiments.

FIG. 13 illustrates an overview flowchart for process 1300 for executing a distribute write task in accordance with at least one of the various embodiments. After a start block, at block 1302, in at least one of the various embodiments, a data blob may be provided for writing to the storage system. In at least one of the various embodiments, writing data to a storage system may be executed using one or more distributed task. Further, in at least one of the various embodiments, during the writing process one or more additional distributed task may be performed on the data concurrently with the write operation. For example, such distributed tasks may include, but are not limited to, erasure coding, compression, cryptographic operations, or the like, or combination thereof.

In at least one of the various embodiments, a data blob that includes the information to be stored may be provided to a file system that may be backed by and/or implemented by a storage system, such as, storage system 600. In at least one of the various embodiments, a client computer, such as, client computer 200, may provide the data blob using one or more standard file system or communication API's supported by its operating system.

In at least one of the various embodiments, the data blob may be accessed and/or provided to a storage management client application, such as, storage management client application 216. In some embodiments, the file system of a client computer may be integrated with one or more storage systems using storage management client application 216.

In at least one of the various embodiments, the data blob may be generated on a network computer, such as, network computer 300. Accordingly, in at least one of the various embodiments, the data blob may be accessed and/or provided to a storage management application, such as, storage management client application 320. In some embodiments, the file system of a network computer may be integrated with one or more storage systems using storage management application 320.

At block 1304, in at least one of the various embodiments, one or more data chunks may be determined from the data blob. In at least one of the various embodiments, the number and/or size the data chunks may be determined to be consistent with the size of the storage units that may be used by the storage system. For example, in at least one of the various embodiments, a 10+2 (ten storage units with two protection units) storage system that is arranged to have storage units of 100 MB will divide a 1000 MB data blob into ten 100 MB data chunks. Likewise, in this example, a 100 MB data blob may be divided into ten 10 MB data chunks.

In at least one of the various embodiments, the data blob may be divided such that the portions of its information may be stored across all of the storage units comprising a data stripe.

At block 1306, in at least one of the various embodiments, one or more target storage computers may be determined for each data chunk of the data blob. In at least one of the various embodiments, the storage management application be arranged to determine which data chunk goes to which storage computer, and/or storage device. In practice, the arrangement and/or configuration of the particular storage system may determine how the data chunks are allocated to different storage computers.

In at least one of the various embodiments, data storage units may be laid out in a variety of ways depending on the protection methods being employed. For example, see FIGS. 5A-5C for non-limiting examples of different storage layouts that may be considered when determining the target storage computer for particular data chunk.

At block 1308, in at least one of the various embodiments, the data chunks may be communicated to the one or more determined storage computers. In at least one of the various embodiments, each data chunk may be communicated to its corresponding determined target storage computer over a network for storage on a storage device.

In at least one of the various embodiments, a storage management application may be arranged to select among one or more available networks and/or network routes depending on the characteristics of those networks, including their current available network bandwidth, or the like.

At block 1310, in at least one of the various embodiments, optionally, one or more distributed tasks that may be associated with the write operation may be executed. In at least one of the various embodiments, during the writing process, one or more additional distributed tasks may be performed on the data concurrently with the write operation. For example, such distributed tasks may include, but are not limited to, erasure coding, compression, cryptographic operations, or the like, or combination thereof. Next, in at least one of the various embodiments, control may be returned to another calling process.

In at least one of the various embodiments, the actions of process 1300 may be performed in parallel for two or more tasks. In at least one of the various embodiments, parallel actions for two more tasks may occur in the same instance of process 1300 or in different instances of process 1300.

Figure 14:
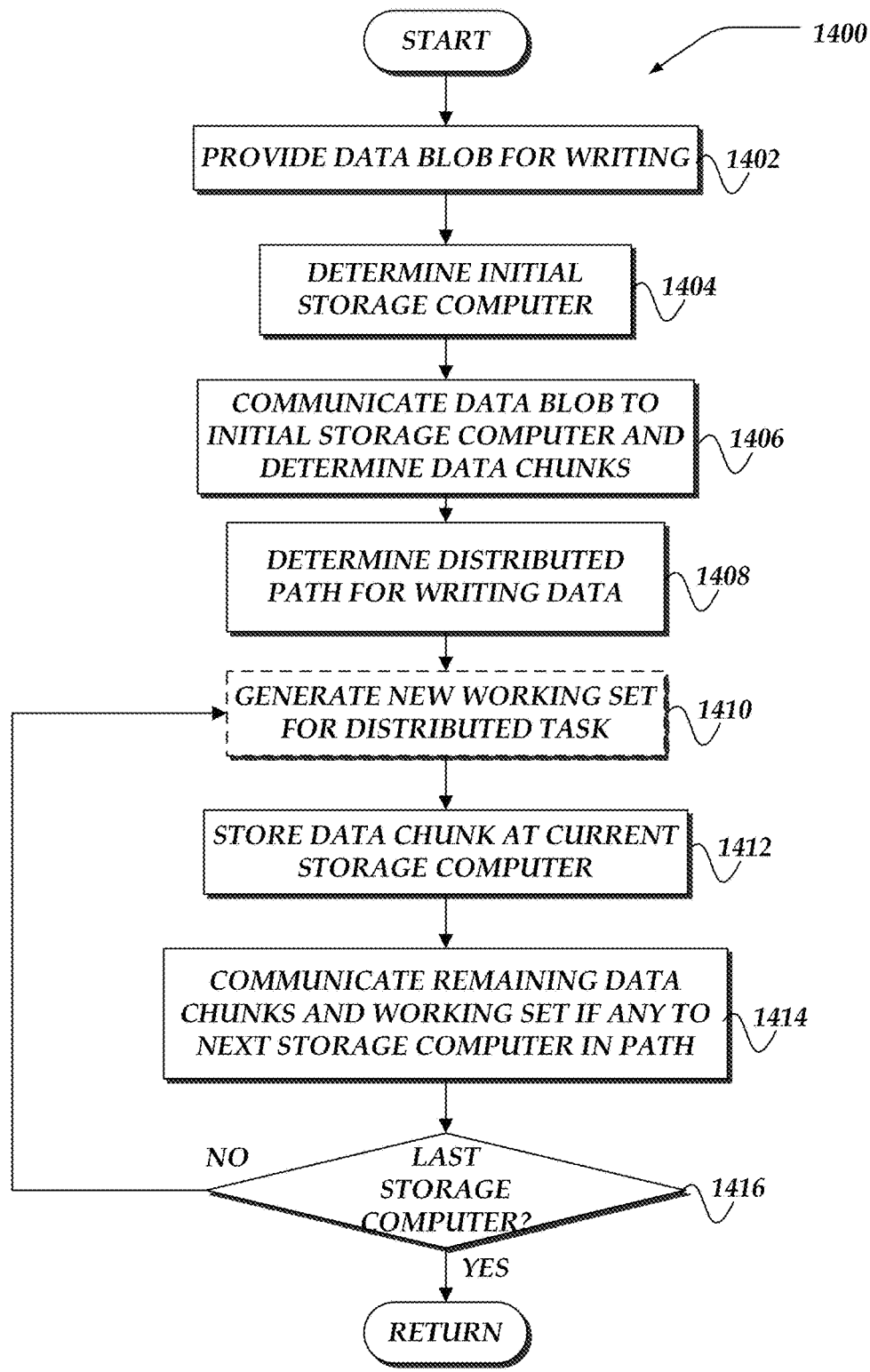
FIG. 14 illustrates an overview flowchart for a process for executing a distributed write task in accordance with at least one of the various embodiments.

FIG. 14 illustrates an overview flowchart for process 1400 for executing a distributed write task in accordance with at least one of the various embodiments. In at least one of the various embodiments, in some aspects process 1400 may be similar to process 1300 as described with FIG. 13. However, in this embodiment, the data blob may be communicated to a storage computer in its entirety before being divided into data chunks. After a start block, at block 1402, in at least one of the various embodiments, a data blob may be provided for writing to the storage system. See, also, block 1302.

At block 1404, in at least one of the various embodiments, an initial storage computer may be determined. In at least one of the various embodiments, a storage management application and/or a storage management client application may be arranged to determine which storage computer to provide the data blob. In at least one of the various embodiments, the determination may consider the network topology and/or network congestion between the source of the data blob and the candidate target storage computers.

In at least one of the various embodiments, the storage computer that may initially receive the data blob may be designated to store one or more portions of the data blob. In other embodiments, the initial storage computer may be designated for receiving the data blob but not storing any portion of the data blob. In some embodiments, two or more storage computers may be determined to receive the data blob or a portion of the data blob at the same time (in parallel).

At block 1406, in at least one of the various embodiments, the data blob may be communicated to the one or more determined initial storage computers and one or more data chunks may be determined from the data blob. In at least one of the various embodiments, data chunks may be determined similarly as described for block 1304.

Further, in at least one of the various embodiments, a storage management application may be arranged to select among one or more available networks and/or network routes depending on the characteristic of those networks, including their current available network bandwidth, or the like.

At block 1408, in at least one of the various embodiments, a distribution path for writing the data chunks to one or more other storage computers may be determined. See, also, block 1306 above.

However, in at least one of the various embodiments, if all of the data chunks for the data blob start at the same storage computer, the determination of the distribution path may consider the impact of communicating that data to each storage computer in the distribution path. See, also, FIG. 7.

At block 1410, in at least one of the various embodiments, optionally, new working set information may be generated that may be associated with the current data chunk at the current storage computer. In at least one of the various embodiments, if there may be one or more distributed tasks concurrently executing with during the write operation, these tasks may include the generation of working set information that may be passed to each storage computer comprising the execution path of the distributed tasks.

At block 1412, in at least one of the various embodiments, the data chunk for the current storage computer may be stored on a storage device associated with the current storage computer. At block 1414, in at least one of the various embodiments, any remaining data chunks and the new working set information (if any) may be communicated to the next storage computer in the distribution path. In at least one of the various embodiments, as each storage computer is reached one or more data chunks may be stored at that storage computer. Accordingly, in at least one of the various embodiments, the amount of data chunks to communicate to the next storage computer is reduced as data chunks are stored in their designate storage computer.

At decision block 1416, in at least one of the various embodiments, if data chunks remained to be processed and/or stored by their designated storage computer, control may loop back to block 1410; otherwise, control may be returned to a calling process.

In at least one of the various embodiments, the actions of process 1400 may be performed in parallel for two or more tasks. In at least one of the various embodiments, parallel actions for two more tasks may occur in the same instance of process 1400 or in different instances of process 1400.

Figure 15:
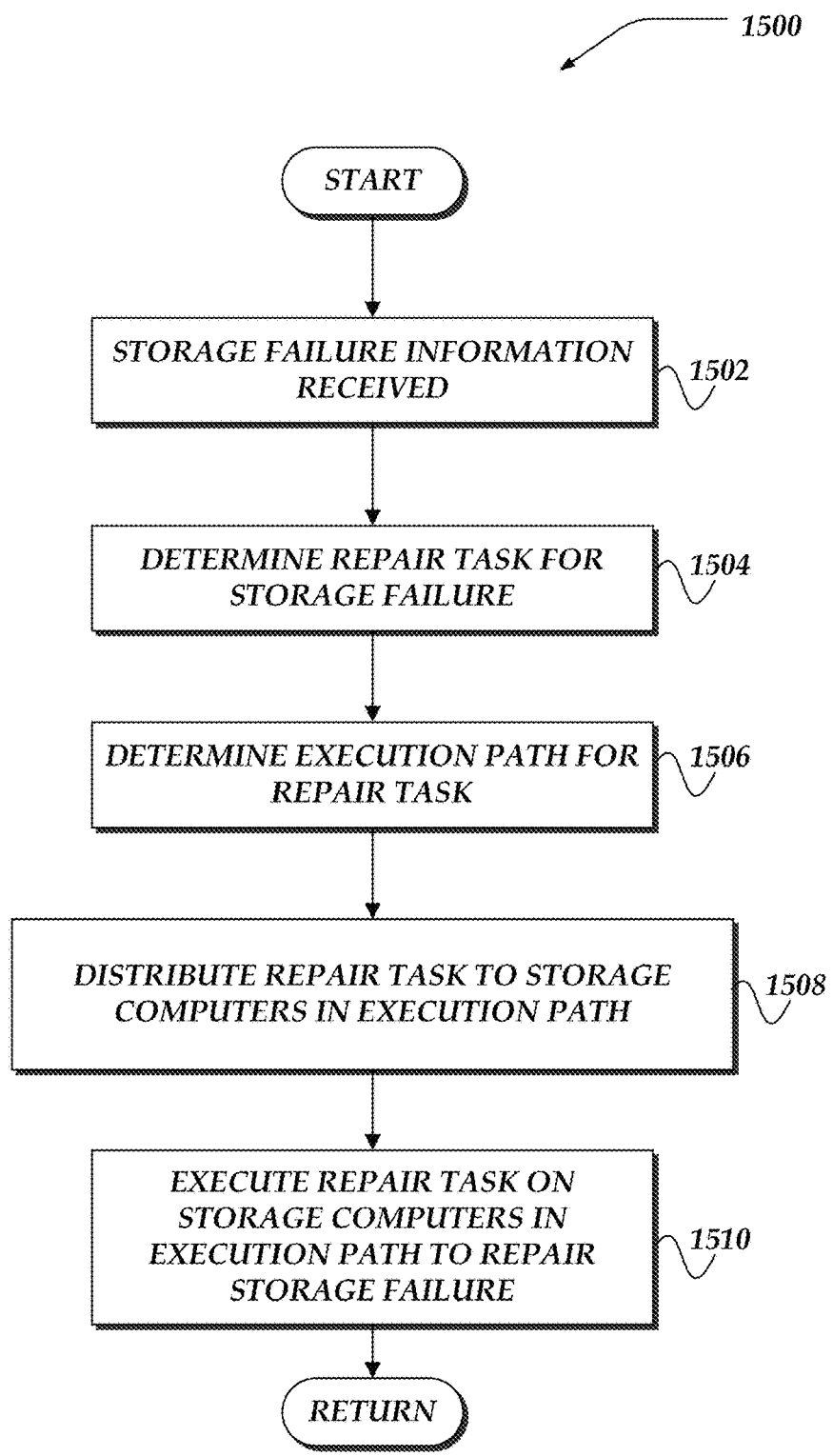
FIG. 15 illustrates an overview flowchart for a process for executing a distributed task for repairing a storage failure in accordance with at least one of the various embodiments.

FIG. 15 illustrates an overview flowchart for process 1500 for executing a distributed task for repairing a storage failure in accordance with at least one of the various embodiments. After a start block, at block 1502, in at least one of the various embodiments, information regarding a storage failure may be provided to a storage management application. Storage failure information may come in a variety of forms, such as, repair events, user input, failure notifications, or the like. In at least one of the various embodiments, the storage failure information may include at least information to determine the type of storage failure, its location with the storage system, or the like.

At block 1504, in at least one of the various embodiments, the particular repair task for responding the storage failure may be determined. in at least one of the various embodiments, the particular repair task may be determined based on the type of storage failure, the location of the storage failure, the type of erasure coding used for protecting the data in the storage system, or the like. In at least one of the various embodiments, configuration information, policy rules, user input, or the like, may be employed for determining which repair task may be appropriate.

At block 1506, in at least one of the various embodiments, the execution path for the repair task may be determined. In at least one of the various embodiments, repair tasks may involve one or more storage computers each having one or more storage devices. Accordingly, in at least one of the various embodiments, a storage management application may be arranged to determine which storage computers are involved with the repair. Further, in at least one of the various embodiments, if the repair task may be distributable, the storage management application may determine the how the repair may be distributed and the order of operation for each portion of the repair task. For example, if the repair task involves recovering data from a storage failure in storage system that uses erasure coding for protection, the repair operations performed on surviving/undamaged data blocks and coding blocks may be executed on separate storage computers as a portion of a distributed task.

In at least one of the various embodiments, the particular execution path for repairing a storage failure may depend on the characteristics of the storage system, such as, type of erasure coding, layout of storage blocks and protection blocks, optimization considerations (e.g., See, FIG. 9), protection level, or the like.

At block 1508, in at least one of the various embodiments, the repair task may be distributed to the storage computers that are in the execution path. In at least one of the various embodiments, the task may be considered a distributed task that is dedicated to repair storage failure in the storage system.

At block 1510, the repair task may be executed on the storage computers that are in the execution path. For example, each distributed portion of the repair task may be executed on a separate storage computer as described above (See, at least, FIG. 11). In some embodiments, the repair task performing repairs may include generating working set information at the first storage computer in the execution path and providing the working set information to a next computer in the execution path. At each subsequent computer, the provided working set information is combined with data stored at the storage computer to create new working set information that in turn is provided to the next storage computer in the execution path. This may continue until each storage computer included in the execution path has contributed to the working set information—thus enabling a repair to be effected. Note, in at least one of the various embodiments, the particular computations and/or transforms executed at each storage computer may vary depending on the particular implementation of erasure coding used for protection. Next, control may be returned to a calling process.

In at least one of the various embodiments, the actions of process 1500 may be performed in parallel for two or more tasks. In at least one of the various embodiments, parallel actions for two more tasks may occur in the same instance of process 1400 or in different instances of process 1500.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitory storage media, or the like.

Accordingly, the illustrations support combinations of means for performing the specified actions, combinations of steps for performing the specified actions and program instruction means for performing the specified actions. It will also be understood that each block of the flowchart illustration, and combinations of blocks in the flowchart

What is claimed as new and desired to be protected by Letters Patent of the United States is:

1. A method for managing tasks for a storage system over a network using a network computer that executes instructions that perform actions, comprising:
  employing two or more of a plurality of storage computers in a single physical chassis of two or more physical chassis of the storage system to provide a distributed ordering of an execution path for one or more tasks based on a type of a plurality of operations that are used to perform the one or more tasks when each storage computer in the execution path is also in the single physical chassis, wherein the distributed ordering of the execution path is based on one or more factors that optimize performance of the type of operations used for the one or more tasks including limiting a number of times that traversal of the execution path requires accessing an external network to the single physical chassis that is slower than an internal network to the single physical chassis, and wherein one or more processors of the two or more of the plurality of storage computers execute instructions to perform actions, including:
    communicating current status information from each of the plurality of storage computers in the single physical chassis to the network computer, wherein the current status information is based on monitoring performance of the one or more tasks; and
    employing one or more conditions for execution of the one or more tasks that are met for execution by each storage computer in the distributed ordering of the execution path to perform further actions, including:
      employing a first storage computer in the distributed ordering of the execution path to provide a working set of intermediate results for the one or more tasks executing on data from the first storage computer;
      iteratively communicating the provided working set of intermediate results to a next storage computer in the distributed ordering of the execution path, wherein the next storage computer employs the provided working set and data from the next storage computer to generate a next working set of intermediate results for the one or more tasks executing on the next storage computer's data until each storage computer's data in the distributed ordering of the execution path is employed to provide a corresponding working set of intermediate results based on a previously provided working set of intermediate results; and
      providing one or more results for the one or more tasks based on the corresponding working sets of intermediate results provided by each storage computer in the distributed ordering of the execution path.

2. The method of claim 1, wherein providing the working set of intermediate results further comprises, providing erasure coding information as part of a storage repair task.

3. The method of claim 1, further comprising storing the one or more results includes on one or more other storage computers that are separate from the two or more storage computers in the distributed ordering of the execution path.

4. The method of claim 1, wherein the optimization of the performance of the execution path is further based on one or more of:
  a type of the one or more tasks;
  a characteristic of the storage system; or
  a characteristic of the network; and
  wherein the type of operations include one or more of associative or direct sequence.

5. A storage system for managing tasks over a network, comprising:
  a network computer comprising:
    a transceiver that is operative to communicate over the network;
    a memory that is operative to store logic; and
    a plurality of processors that are operative to execute the logic to perform actions, including:
      enabling two or more of a plurality of storage computers in a single physical chassis of two or more physical chassis of the storage system to provide a distributed ordering of an execution path for one or more tasks based on a type of a plurality of operations that are used to perform the one or more tasks when each storage computer in the execution path is also in the single physical chassis, wherein the distributed ordering of the execution path is based on one or more factors that optimize performance of the type of operations used for the one or more tasks including limiting a number of times that traversal of the execution path requires accessing an external network to the single physical chassis that is slower than an internal network to the single physical chassis;
      enabling one or more of the plurality of storage computers to communicate current status information from each of the plurality of storage computers in the single physical chassis to the network computer, wherein the current status information is based on monitoring performance of the one or more tasks; and
      enabling one or more processors of the two or more of the plurality of storage computers, to perform actions, including:
        employing one or more conditions for execution of the one or more tasks that are met for execution by each storage computer in the distributed ordering of the execution path, performing further actions, including:
          employing a first storage computer in the distributed ordering of the execution path to provide a working set of intermediate results for the one or more tasks executing on data from the first storage computer;
          iteratively communicating the provided working set of intermediate results to a next storage computer in the distributed ordering of the execution path, wherein the next storage computer employs the provided working set and data from the next storage computer to generate a next working set of intermediate results for the one or more tasks executing on the next storage computer's data until each storage computer's data in the distributed ordering of the execution path is employed to provide a corresponding working set of intermediate results based on a previously provided working set of intermediate results; and providing one or more results for the one or more tasks to the network computer, wherein the one or more results are based on the corresponding working sets of intermediate results provided by each storage computer in the distributed ordering of the execution path.

6. The system of claim 5, wherein providing the working set of intermediate results further comprises, providing erasure coding information as part of a storage repair task.

7. The system of claim 5, further comprising storing the one or more results includes on one or more other storage computers that are separate from the two or more storage computers in the distributed ordering of the execution path.

8. The system of claim 5, wherein the optimization of the performance of the execution path is further based on one or more of:
  a type of the one or more tasks;
  a characteristic of the storage system; or
  a characteristic of the network; and
  wherein the type of operations include one or more of associative or direct sequence.

9. A processor readable non-transitory storage media that includes logic for managing tasks for a storage system over a network, wherein execution of the logic by one or more processors performs actions, comprising:
  employing two or more of a plurality of storage computers in a single physical chassis of two or more physical chassis of the storage system to provide a distributed ordering of an execution path for one or more tasks based on a type of a plurality of operations that are used to perform the one or more tasks when each storage computer in the execution path is also in the single physical chassis, wherein the distributed ordering of the execution path is based on one or more factors that optimize performance of the type of operations used for the one or more tasks including limiting a number of times that traversal of the execution path requires accessing an external network to the single physical chassis that is slower than an internal network to the single physical chassis;
  employing one or more of the plurality of storage computers to communicate current status information from each of the plurality of storage computers in the single physical chassis to the network computer, wherein the current status information is based on monitoring performance of the one or more tasks; and
  employing one or more processors of the two or more of the plurality of storage computers, to perform actions, including:
    employing one or more conditions for execution of the one or more tasks that are met for execution by each storage computer in the distributed ordering of the execution path, performing further actions, including:
      employing a first storage computer in the execution path to provide a working set of intermediate results for the one or more tasks executing on data from the first storage computer;
      iteratively communicating the provided working set of intermediate results to a next storage computer in the distributed ordering of the execution path, wherein the next storage computer employs the provided working set and data from the next storage computer to generate a next working set of intermediate results for the one or more tasks executing on the next storage computer's data until each storage computer's data in the distributed ordering of the execution path is employed to provide a corresponding working set of intermediate results based on a previously provided working set of intermediate results; and
      providing one or more results for the one or more tasks based on the corresponding working sets of intermediate results provided by each storage computer in the distributed ordering of the execution path.

10. The processor readable non-transitory storage media of claim 9, wherein providing the working set of intermediate results further comprises, providing erasure coding information as part of a storage repair task.

11. The processor readable non-transitory storage media of claim 9, further comprising storing the one or more results includes on one or more other storage computers that are separate from the two or more storage computers in the distributed ordering of the execution path.

12. The processor readable non-transitory storage media of claim 9, wherein the optimization of the performance of the execution path is further based on one or more of:
  a type of the one or more tasks;
  a characteristic of the storage system; or
  a characteristic of the network; and
  wherein the type of operations include one or more of associative or direct sequence.

13. A storage computer that is operative for managing tasks in a storage system over a network, wherein the storage system includes a plurality of storage computers, and wherein each storage computer comprises:
  a transceiver that is operative to communicate over a network;
  a memory that is operative to store logic; and
  one or more processors that are operative to execute instructions that enable actions, including:
    enabling two or more of a plurality of storage computers in a single physical chassis of two or more physical chassis of the storage system to provide a distributed ordering of an execution path for one or more tasks based on a type of a plurality of operations that are used to perform the one or more tasks when each storage computer in the execution path is also in the single physical chassis, wherein the distributed ordering of the execution path is based on one or more factors that optimize performance of the type of operations used for the one or more tasks including limiting a number of times that traversal of the execution path requires accessing an external network to the single physical chassis that is slower than an internal network to the single physical chassis;
    communicating current status information from each of the plurality of storage computers in the single physical chassis to the network computer, wherein the current status information is based on monitoring performance of the one or more tasks; and
    enabling one or more processors of the two or more of the plurality of storage computers, to enable actions, including:
      employing one or more conditions for execution of the one or more tasks that are met for execution by each storage computer in the distributed ordering of the execution path to perform further actions, including:
        employing a first storage computer in the execution path to provide a working set of intermediate results for the one or more tasks executing on data from the first storage computer;

iteratively communicating of the provided working set of intermediate results to a next storage computer in the execution path, wherein the next storage computer employs the provided working set and data from the next storage computer to generate a next working set of intermediate results for the one or more tasks executing on the next storage computer's data until each storage computer's data in the distributed ordering of the execution path is employed to provide a corresponding working set of intermediate results based on a previously provided working set of intermediate results; and providing of one or more results for the one or more tasks based on the corresponding working sets of intermediate results provided by each storage computer in the distributed ordering of the execution path.

14. The storage computer of claim 13, wherein providing the working set of intermediate results further comprises, providing erasure coding information as part of a storage repair task.

15. The storage computer of claim 13, further comprising storing the one or more results includes on one or more other storage computers that are separate from the two or more storage computers in the distributed ordering of the execution path.

16. The storage computer of claim 13, wherein the optimization of the performance of the execution path is further based on one or more of:

a type of the one or more tasks;

a characteristic of the storage system; or a characteristic of the network; and wherein the type of operations include one or more of associative or direct sequence.

* * * * *